United States Patent
Hsueh et al.

(10) Patent No.: US 7,523,376 B2
(45) Date of Patent: Apr. 21, 2009

(54) APPARATUS FOR ACCESSING AND TRANSFERRING OPTICAL DATA

(75) Inventors: Ching-Wen Hsueh, I Lan Hsien (TW); Li-Lien Lin, Hsin Chu (TW)

(73) Assignee: Mediatek Incorporation, Hsin-Chu (TW)

( * ) Notice: Subject to any disclaimer, the term of this patent is extended or adjusted under 35 U.S.C. 154(b) by 537 days.

(21) Appl. No.: 11/260,146

(22) Filed: Oct. 28, 2005

(65) Prior Publication Data
US 2006/0107172 A1    May 18, 2006

(30) Foreign Application Priority Data
Oct. 29, 2004    (TW) ............... 93133136 A

(51) Int. Cl.
*H03M 13/00* (2006.01)
(52) U.S. Cl. .................. 714/752; 714/786
(58) Field of Classification Search ............ 714/752, 714/784, 763, 770, 755, 786
See application file for complete search history.

(56) References Cited
U.S. PATENT DOCUMENTS

| | | | |
|---|---|---|---|
| 5,386,425 A * | 1/1995 | Kim | .............. 714/755 |
| 6,742,157 B2 * | 5/2004 | Shieh et al. | .............. 714/758 |
| 7,055,082 B2 * | 5/2006 | Mori et al. | .............. 714/768 |
| 7,355,936 B2 * | 4/2008 | Senshu | .............. 369/47.24 |

* cited by examiner

Primary Examiner—Esaw T Abraham
Assistant Examiner—Fritz Alphonse
(74) Attorney, Agent, or Firm—Birch, Stewart, Kolasch & Birch, LLP

(57) ABSTRACT

An accessing/transferring apparatus has a first memory having multiple memory banks, each of the memory banks having multiple logical memory sections, each of the logical memory sections forming a memory matrix; a memory controller that uses the page-mode function or alternate-bank-access function of the first memory to write the data of the error correction block into the logical memory sections along a column direction; and an error correction decoder using the page-mode function or alternate-bank-access function of the first memory to access the data of the error correction block from the logical memory sections along the row direction. The present invention uses the features of a dynamic random access memory (DRAM), such as page-mode function and alternate-bank-access function, and the data arrangement of the memory to improve the access speed of the memory to increase the accessing efficiency of optical data.

88 Claims, 21 Drawing Sheets

| $LDC_{2i,0}$ | $LDC_{2i,1}$ | ... | $LDC_{2i,303}$ |
|---|---|---|---|
| $LDC_{2i+1,0}$ | $LDC_{2i+1,1}$ | ... | $LDC_{2i+1,303}$ |

FIG. 5

APPARATUS FOR ACCESSING AND TRANSFERRING OPTICAL DATA

BACKGROUND OF THE INVENTION

1. Field of the Invention

The present invention is related to an apparatus for accessing and transferring optical data, and more particularly, to an apparatus that can be applied to a means of decoding a Blu-ray disk.

2. Description of Related Art

Conventional optical disks, such as digital versatile disks (DVD) or video compact disks (VCD), are extensively used in business activities or family life. They are usually used to store a mass of video, audio or other digital data, such as movies, music files, application software, etc. In order to make the optical disks capable of having a larger storage capacity, a standard for Blu-ray disks has been defined recently to satisfy the future requirements of users, in which a Blu-ray disk has a storage capacity more than five times greater than that of a DVD.

Reference is made to FIG. 1, which is a flowchart diagram that illustrates the decoding process for a Blu-ray disk. Firstly, a means of decoding a Blu-ray disk divides the user data into frames, each of which has 2048 data bytes and 4 bytes error detection codes. 32 frames of the user data is taken to form a data frame 200.

The data frame 200 is re-arranged to form a data block 202, which is a data matrix with 304 columns and 216 rows. Further, before being re-arranged, every frame of the user data is scrambled to form a scrambled data frame.

Thereafter, the encoding means generates 32 parity rows of long distance error correction codes (LDC) for every data block 202 to form a LDC block 204. Every column of the LDC block 204 is a LDC code. Hence, one LDC block 204 has 304 LDC codes.

Subsequently, the LDC block 204 is re-arranged to form a LDC cluster 206, which is a data matrix with 152 columns and 496 rows. In the re-arranging process, the LDC block 204 is interleaved twice to reduce burst errors.

On the other hand, for data accessing, the logical address and control data 208 and physical address 210 are added to the encoding process, in which the data and addresses are also encoded. For every user frame 200, the encoding means will provide the logical address and control data 208 for 32×18 bytes and the physical address 210 for 16×9 bytes.

In the encoding process, the logical address, the control data 208 and the physical address 210 are combined and re-arranged to form an access block 212, which is a data matrix with 24 columns and 30 rows.

Thereafter, the encoding means generates 32 parity rows of the burst indicator subcode (BIS) for the access block 212 to form a BIS block 214. Every BIS block 214 is re-arranged to form a BIS cluster 216, which is a data matrix with 3 columns and 496 rows. In the re-arranging process, the BIS block 214 is interleaved once.

After the LDC cluster 206 and the BIS cluster 216 are formed, the encoding means divides the LDC cluster 206 into four equal parts and divides the BIS cluster 216 into three equal parts. Thereafter, the encoding means inserts the BIS cluster 216 into the LDC cluster 206 and provides a frame sync to form a physical cluster 218. Lastly, the encoding means modulates the data of the physical cluster 218 and proceeds with the recoding procedure to form an error correction modulation block on the optical disk.

During the data accessing operation, a conventional accessing/transferring apparatus uses an optical reading head to access the data recorded on the optical disk, de-modulates the accessed data and abstracts the LDC and BIS data.

In the data accessing process, the conventional accessing/transferring apparatus de-interleaves the LDC and BIS data respectively to recover the LDC block and BIS block. The LDC data should be de-interleaved twice while the BIS data should only be de-interleaved once.

In addition, after de-interleaving, the conventional accessing/transferring apparatus uses the parities of the LCD and BIS to correct the LDC and BIS data and uses the error detection codes of the data frame 200 to check the LDC data to ensure that the data passed to the host is correct.

Therefore, in the accessing process, the conventional accessing/transferring apparatus performs an error correction process for every error correction block, i.e. the LDC block 204 or the BIS block 214, and then outputs the results.

The error correction block is a matrix with multiple columns and multiple rows. Every column of the matrix is a decoding unit for error correction and every row is a storage unit for recoding data in order on the optical disk. For forming the error correction modulation block, the order of the modulated data of the data row recoded in the optical disk is related to the order of the data of the data row of the error correction block.

In the data accessing process, the data of the LDC block 204 and BIS block 214 is temporarily stored in a dynamic random access memory (DRAM) of the conventional accessing/transferring apparatus for performing the error correction process. Taking the LDC block 204 as an example, reference is made to FIG. 2, which is a diagram showing the arrangement of the LDC data stored in the DRAM in compliance with the prior art. The direction of the arrow indicates the direction of the address arrangement of the DRAM. When the conventional accessing/transferring apparatus accesses the LDC block 204 for performing the error correction process, it takes out the data of the LDC block 204 from the DRAM column by column.

However, in the prior art, in order to access the data more efficiently, the DRAM usually has a page-mode function, which makes the data with the same row address, i.e. the data stored on the same memory page, accessible by sending the row address when accessing the first data and only sending the column address when accessing the following data.

Moreover, since the DRAM will only charge a memory block with the same row address to activate the memory block once, the DRAM not only needs to send out a row address but also needs to wait a predetermined charging time when accessing the data with a different row address. Hence, if the number of switching times of different row addresses increases, the efficiency of the DRAM is considerably reduced.

In the accessing process of the LDC block 204, although the conventional accessing/transferring apparatus can store the accessed data into the DRAM continuously, it usually needs to access the data with different row addresses during the decoding and transmission processes. As described above, because using the memory block with different row addresses requires waiting a predetermined charging time, the accessing efficiency of the LDC block 204 is reduced. Hence, the conventional accessing/transferring apparatus consumes a lot of time when accessing the data from the optical disk.

In accordance with the description above, since the conventional accessing/transferring apparatus needs to perform page-crossing access many times in the data accessing operation, its accessing efficiency is limited considerably.

Accordingly, as discussed above, the prior art still has some drawbacks that could be improved upon. The present invention aims to resolve the drawbacks in the prior art.

SUMMARY OF THE INVENTION

The present invention provides an accessing/transferring apparatus, including a first memory having a plurality memory banks and supporting a page-mode function and an alternate-bank-access function, each of the memory banks having a plurality of logical memory sections, each of the logical memory sections forming a memory matrix; a memory controller used to control the first memory to use its page-mode function or alternate-bank-access function to write the data of the error correction block into the logical memory sections along a column direction of the logical memory sections; and an error correction decoder using the page-mode function or alternate-bank-access function of the first memory to access each column of the data matrix of the error correction block from the logical memory sections along the row direction of the logical memory sections.

BRIEF DESCRIPTION OF THE DRAWINGS

FIG. 5 is a schematic diagram of a preferred arrangement of data stored in the SRAM;

DETAILED DESCRIPTION OF PREFERRED EMBODIMENTS

Figure 3:
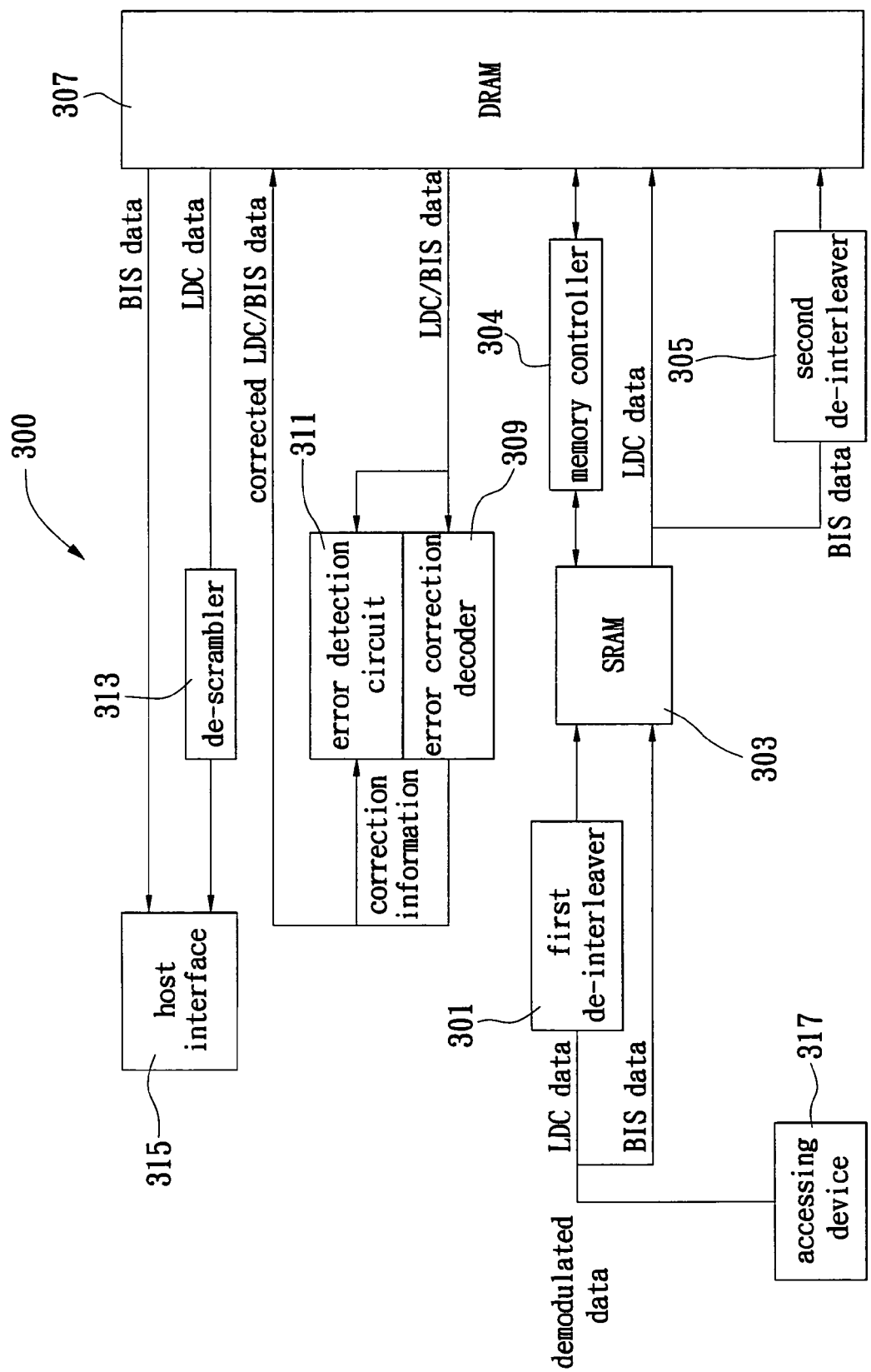
FIG. 3 is a block diagram of the first preferred embodiment.

Reference is made to FIG. 3, which is a block diagram of the first preferred embodiment. The accessing/transferring apparatus 300 includes a first de-interleaver 301, a static random access memory (SRAM) 303, a memory controller 304, a second de-interleaver 305, a DRAM 307, an error correction decoder 309, an error detection circuit 311, a de-scrambler 313, a host interface 315 and an accessing device 317.

In this embodiment, the DRAM 307 is a synchronous dynamic random access memory (SDRAM), which has multiple memory banks. The DRAM 307 has not only a page-mode function but also an alternate-bank-access function. Hence, once the optical data is being continuously written into or read from different memory pages belonging to different memory banks, the DRAM 307 charges and activates the target memory page of the next memory bank in advance to increase the efficiency of data access. If the burst length of the data needed to be written into or read from the same memory bank is large enough, using the alternate-bank-access function can completely hide the necessary charging and activating time of the memory banks and memory pages.

Figure 4A:
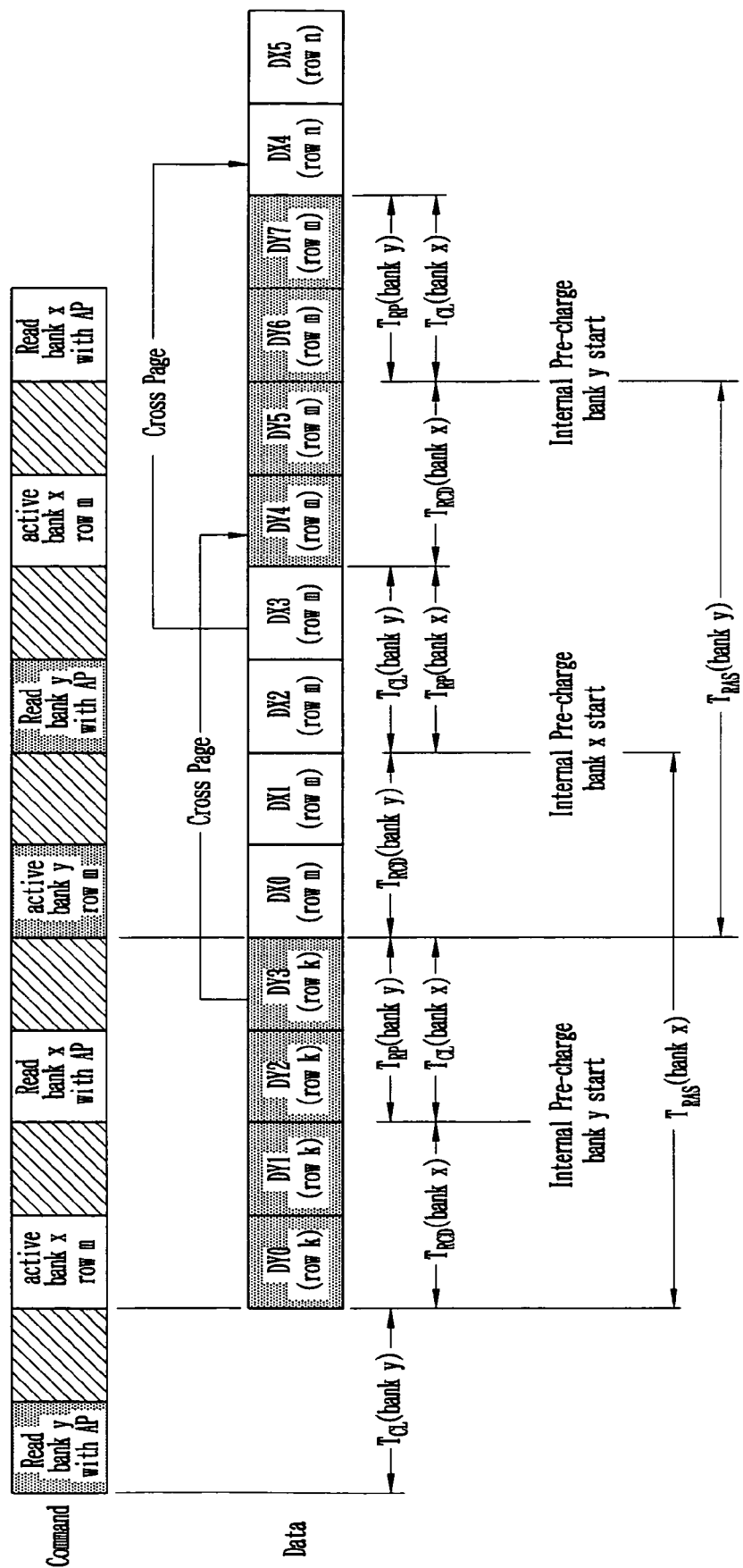
FIGS. 4a and 4b illustrate the data-storing operation of the DRAM.
Figure 4B:
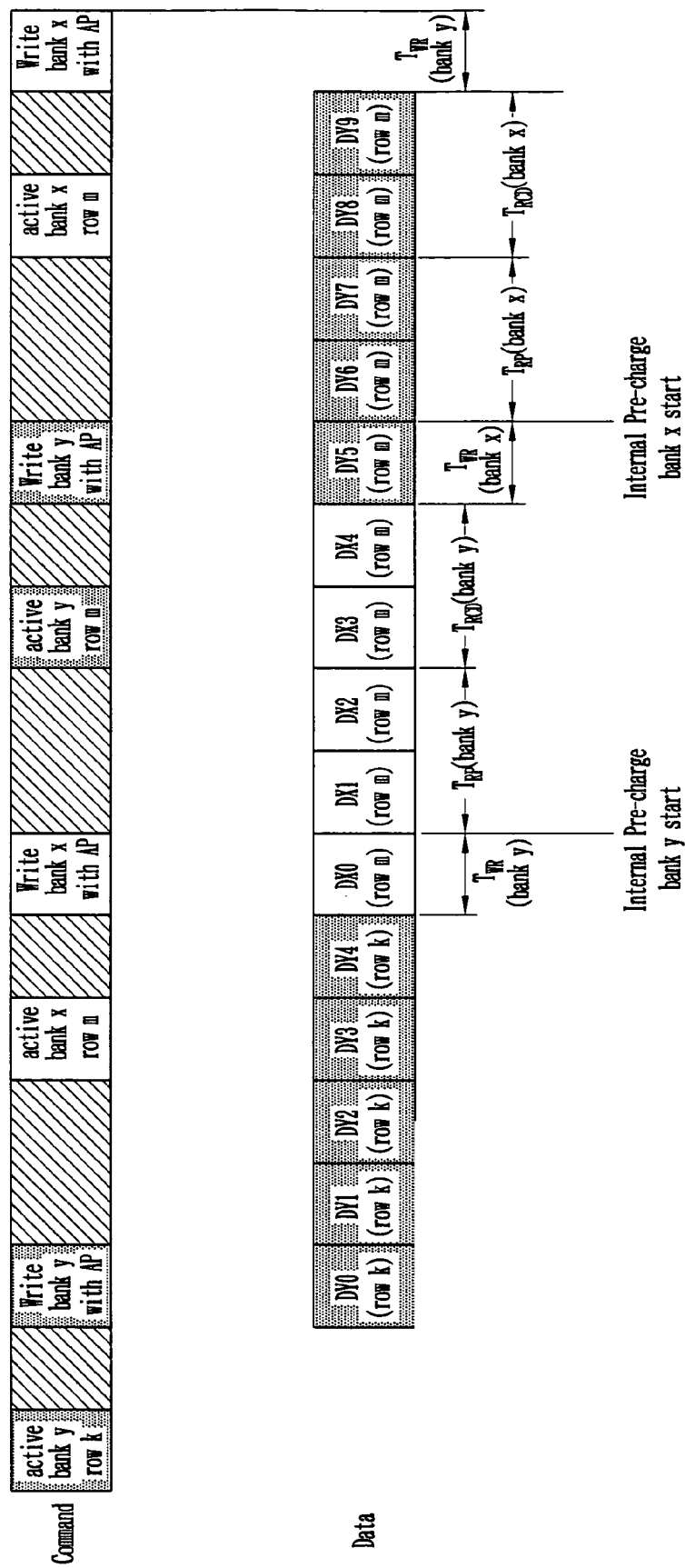

In order to further clarify the alternate-bank-access function of memory banks, reference is made to FIG. 4a to illustrate how the charging time and the activating time are hidden when reading data from the DRAM. Reference is also made to FIG. 4b to illustrate how the charging time and the activating time are hidden when writing data into the DRAM. In these two figures, for convenience of explanation, the DRAM 307 is assumed to just have two memory banks, which are designated as bank x and bank y respectively. Each of these two figures is formed with two portions. The first portion shows the commands that are executed by the DRAM 307. The other portion shows the data accessed or written by the DRAM 307. In order to represent the data of bank x or bank y, DX is used to designate the data of bank x and DY is used to designate the data of bank y in these two figures.

As shown in FIG. 4A, when the data stored in bank y of the DRAM 307 (i.e. DY0-DY3) is accessed, bank x is activated and the command for accessing bank x is processed at the same time. The consumed time for performing these two actions is $(T_{RCD}+T_{CL})$. Therein, $T_{RCD}$ represents the consumed time for activating a memory page of a memory bank and $T_{CL}$ represents the consumed time for preparing the first data that is ready to be accessed. Hence, once the consumed time for accessing the data of bank y is longer than $(T_{RCD}+T_{CL})$, the activation time and the data preparation time of bank x can be hidden. Therein, the length of the accessed data is called the "burst length" of the DRAM 307. As for the pre-charging time of bank x, it is hidden within the consumed time for accessing the data of bank x. In FIG. 4A, the starting time for pre-charging bank y is shown.

As mentioned above, one can understand that once the burst length is larger enough to make the data accessing time larger than $(T_{RCD}+T_{CL})$, the alternate bank access function can be used to hide the pre-charging time, the activation time and the data preparation time.

As shown in FIG. 4B, when data is written in bank x of the DRAM 307 (i.e. DX0-DX3), bank y is activated and pre-charged at the same time. The consumed time for performing these two actions is $(T_{RP}+T_{RCD}+T_{WR})$. Therein, $T_{RP}$ represents consumed time for pre-charging a memory bank and $T_{WR}$ represents consumed time for write recovery. Hence, once the consumed time for writing data into bank x is longer than $(T_{RP}+T_{RCD}+T_{WR})$, the activation time and the pre-charge time of bank y can be hidden. Therein, the length of the written data is also called the "burst length" of the DRAM 307.

As mentioned above, one can understand that once the burst length is larger enough to make data writing time larger than ($T_{RP}+T_{RCD}+T_{WR}$), the alternate bank access function can be used to hide the pre-charging time and the activation time.

Furthermore, in this embodiment, the DRAM 307 has at least two memory banks to perform the alternate bank access function. In practice, the number of memory banks of the DRAM 307 is not limited. In general, DRAMs available in the market usually have two or four memory banks. Hence, most of the DRAMs available in the market can be used in the present invention.

In addition, the DRAM 307 of this embodiment doesn't need to be a synchronous dynamic random access memory (SDRAM). It can be other kinds of memories that have a page-mode function and an alternate-bank-access function.

In this embodiment, when accessing an optical disk the optical disc drive first uses the accessing device 317 to access the data of error correction modulation blocks from the optical disk. The accessing device 317 has a pick-up head (PUH) and a demodulator (not shown). The optical disk drive uses the pick-up head to read the data of the error correction modulation blocks recorded in the optical disk. Then, the demodulator is used to demodulate the data of the error correction modulation blocks.

After the accessing/transferring apparatus 300 obtains the data of the error correction modulation blocks, it extracts the data of the long distance error correction codes (LDC) and delivers the data to the first de-interleaver 301 for de-interleaving. The remaining data, which is the data of the burst indicator subcodes (BIS), is delivered to the SRAM 303 directly.

Therein, the first de-interleaver 301 is used to produce the de-interleaving addresses of the SRAM 303 to perform two kinds of de-interleaving operations. In this way, the order of the arrangement of the LDC data is recovered and the LDC data is able to be stored in the SRAM 303 orderly.

Furthermore, after the de-interleaving operations are performed, the order of the arrangement of the LDC data is recovered. Thus, the LDC data is recovered as a data matrix having 304 columns and 248 rows. Therein, the first 216 rows form a data block. This portion is the target data that a user really wants to obtain. The remained 32 rows form a parity block. This portion is the parity codes of the target data.

In addition, in the real accessing/transferring apparatus, due to cost considerations, the capacity of the SRAM is usually much smaller than that of the DRAM. Thus, the SRAM is usually able to store a portion of an LDC data matrix. This means that the SRAM can only store a few rows of the LDC data matrix.

For this sake, the SRAM 303 used in the present invention is only able to store a few rows of the LDC data matrix. However, the present invention is not limited to the capacity of the SRAM 303. In practice, the SRAM 303 can be one that can only accommodate one row of the LDC data matrix or one that has a larger capacity to improve the efficiency of the present invention.

It should be noted that the SRAM 303 of the present invention only needs to have a capacity capable of storing two rows of the LDC data matrix to use the alternate-bank-access function to make the data writing action obtain optimal efficiency. This means that the pre-charging time and the activation time of the memory banks or memory pages can be hidden in the process of writing data into the DRAM 307.

After the LDC data or BIS data is stored into the SRAM 303, the accessing/transferring apparatus 300 uses the memory controller 304 to control the SRAM 303 and the DRAM 307 to read the LDC data from the SRAM 303 and store the data into the DRAM 307.

Therein, the addresses of the DRAM 307 have a specific arrangement. Hence, the alternate-bank-access function of the DRAM 307 can be used to improve the reading or writing efficiency of the DRAM 307. This portion is detailed below.

During the action of storing the LDC data into the DRAM 307, the accessing/transferring apparatus 300 delivers the BIS data to the second de-interleaver 305 for performing the de-interleaving operation.

Therein, the second de-interleaver 305 only performs one kind of de-interleaving operation on the BIS data. The second de-interleaver 305 produces de-interleaving addresses of the DRAM 307 to create the arrangement order of the BIS data recovered. After the de-interleaving operation is performed, the BIS data is stored into the DRAM 307 in order.

It should be noticed that the second de-interleaver 305 first performs a de-interleaving operation on the BIS data to produce de-interleaving addresses of SRAM and DRAM. Then, the second de-interleaver 305 reads the data of the SRAM 303 according to the de-interleaving addresses of the SRAM and stores the data into the DRAM 307 according to the de-interleaving addresses of the DRAM. In this way, the BIS block is recovered.

Reference is made to FIG. 5, which is a schematic diagram of a preferred arrangement of data stored in the SRAM. As shown in the figure, the LDC data forms a data matrix having 304 columns and 248 rows. In this embodiment, the data of the data matrix is designated as $\{LDC_{x,y}, x=0\sim247, y=0\sim303\}$. Therein, every column of the data matrix forms a LDC codeword. Thus, as shown in FIG. 5, the SRAM 303 of this embodiment can accommodate two rows of the data matrix of the LDC data, which are designated as $\{LDC_{2i,j}, i=0\sim123, j=0\sim303\}$ 及 $\{LDC_{2i+1,j}, i=0\sim123, j=0\sim303\}$.

Figure 6:
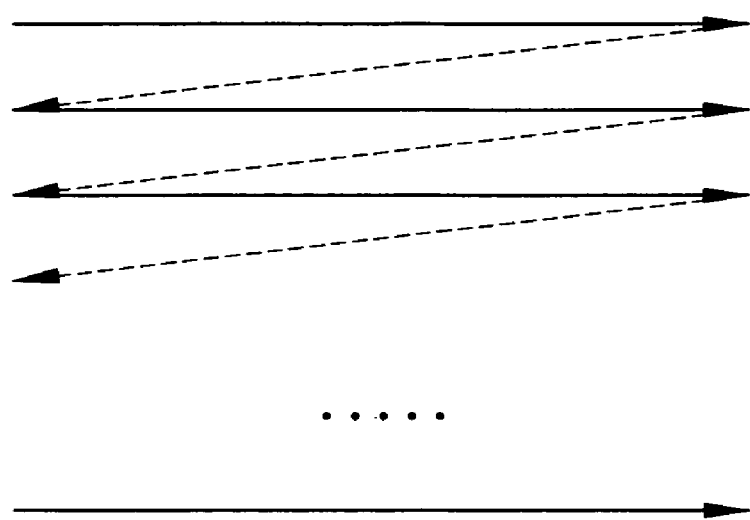
FIG. 6 is a schematic diagram showing a writing procedure for the SRAM.
Figure 7:
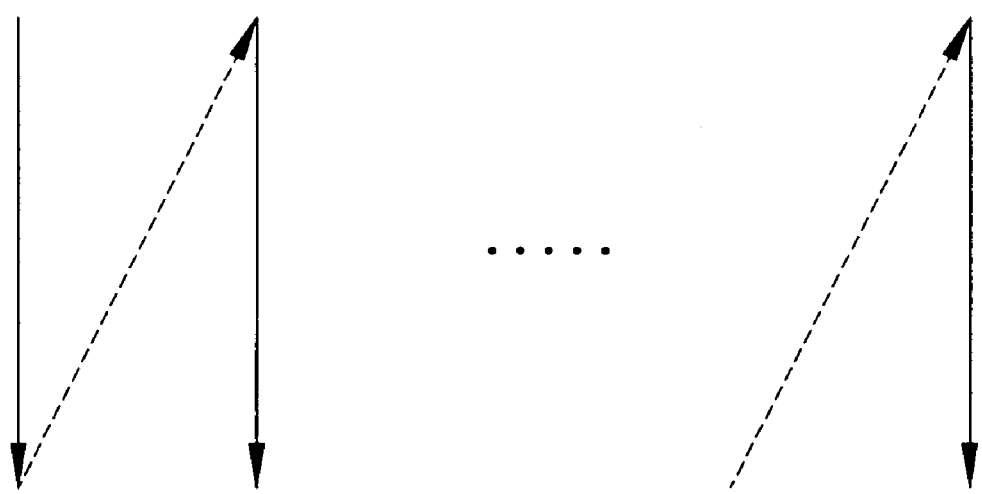
FIG. 7 is a schematic diagram showing a reading procedure for the SRAM.

Reference is made to FIG. 6 and FIG. 7. FIG. 6 is a schematic diagram showing a writing procedure for the SRAM while FIG. 7 is a schematic diagram showing a reading procedure for the SRAM. As shown in FIG. 6, the LDC data is orderly stored in the SRAM 303 in a row direction. Therein, every solid line represents 304 bytes of data. As shown in FIG. 7, the LDC data is orderly read out from the SRAM 303 in a column direction. Therein, every solid line represents 2 bytes of data.

However, in practice, the writing or reading procedure of the present invention is not limited to the foresaid method. The present invention can use other methods. Furthermore, since the writing and reading speed of the SRAM is much faster than that of the DRAM, different writing or reading procedures don't influence the efficiency of the present invention.

Figure 8A:
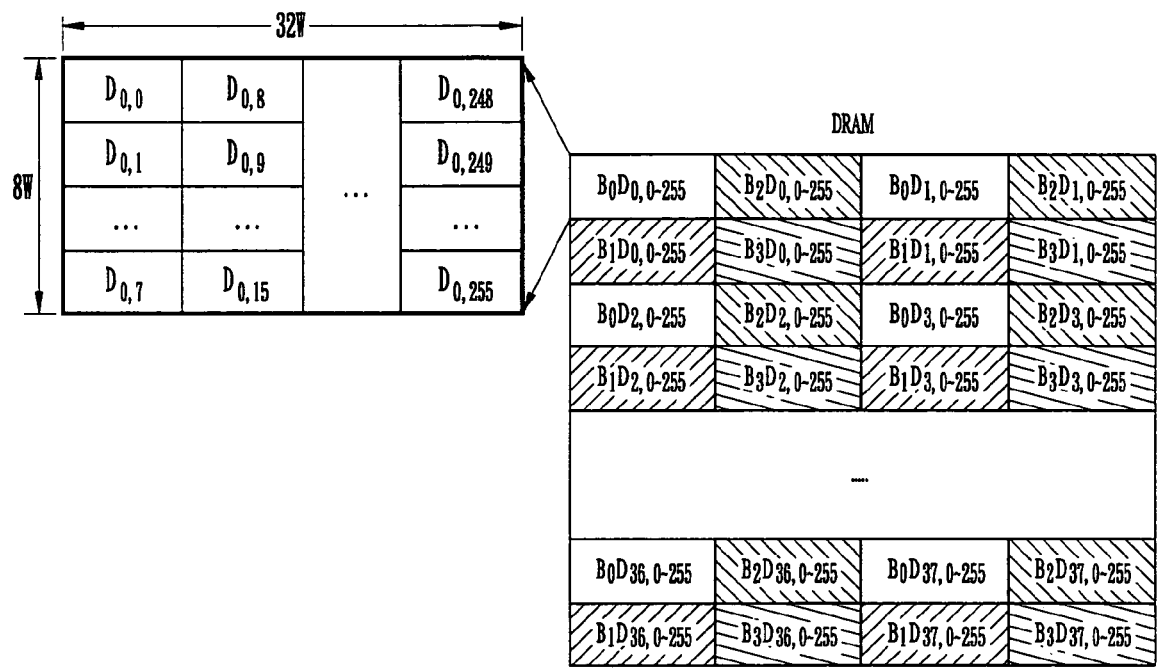
FIG. 8a shows the arrangement of logical memory sections for the DRAM.

Reference is made to FIG. 8A, which shows the arrangement of logical memory sections of the DRAM. In this embodiment, the DRAM 307 has four memory banks. Every memory bank is divided into multiple logical memory sections. For convenience, $B_xD_{y,z}$ is used to represent the data located in the xth memory bank, the yth memory page and the zth memory location, where $x=0\sim3$ and $y=0\sim255$. As shown in FIG. 8A, the logical memory sections are designated as $\{B_xD_{y,0-255}, x=0\sim3, y=0\sim37\}$. Meanwhile, in this embodiment, every memory page is divided to form multiple 8×32 matrices, each of which has 256 words, to improve the reading and writing efficiency.

In practice, the DRAM 307 of the present invention needs at least two memory banks for performing the alternate-bank-access function. Hence, the number of the memory banks of the DRAM 307 has to be greater than two. In addition, it is clear that the capacity of each memory bank is not limited to 76 rows physical memory sections, each memory section is not limited to 256 memory units and each memory unit is not limited to store a word (i.e. 2 bytes). Furthermore, in the present invention, each logical memory section of the memory banks is not limited to being a 8×32 matrix.

Figure 8B:
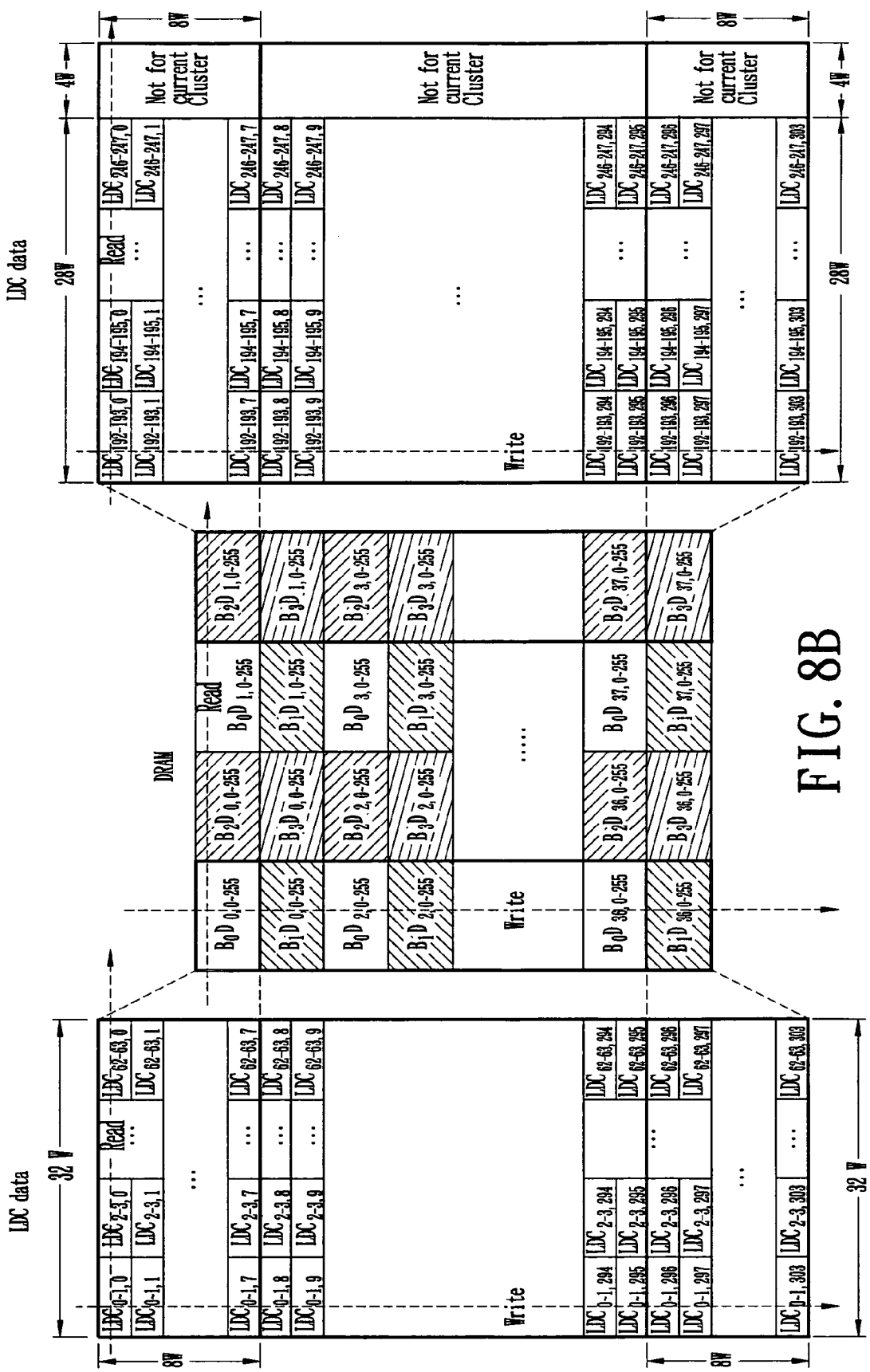
FIG. 8b shows a method for storing LDC data into the DRAM.

Reference is made to FIG. 8B, which shows a method for storing LDC data into the DRAM. The data of the SRAM designated as $\{LDC_{2i+1,j}, LDC_{2i,j}\}$ is take out to be stored into the $B_xD_{y,z}$ location of the DRAM, where x={mod(floor(i/32), 2)*2+mod(floor (j/8),2)}, y={floor (j/16)*2+floor (i/64)} and z={8*mod(i,32)+mod(j,8)}. Therein, floor (m) represents an integer number that is closest to and smaller than the value of m and mod(m,n) represents the remainder of m/n. Taking the first and second rows of the LDC data for an example, the data designated as $(LDC_{2i+1,j}, LDC_{2i,j}, i=0, j=0\sim303)$ is orderly written into the memory locations designated as $B_0D_{0,0\sim7}$, $B_1D_{0,0\sim7}$, $B_0D_{2,0\sim7}$, $B_1D_{2,0\sim7}$ ... $B_0D_{2m,0\sim7}$, $B_1D_{2m,0\sim7}$ ... $B_0D_{36,0\sim7}$, $B_1D_{36,0\sim7}$. It is clear that the writing action is switched to another memory bank after every time 8 words are written into the DRAM.

In this embodiment, the burst length of data being written every time into the DRAM307 is 8 words (i.e. 16 bytes). As shown in FIG. 8B, every 8 words of data form a group in this embodiment. Every time when 8 words of data are written into a memory page of a memory bank, the accessing/transferring apparatus 300 uses another memory page of another memory bank to store the following 8 words of data.

Furthermore, in this embodiment, since the 8 words of data stored in the same memory bank is located in the same memory page and has continuous memory addresses, the consumed time of the writing procedure of these 8 words of data is sufficient for finishing the pre-charge action and the activation action of the next memory bank's memory page. Hence, this embodiment can completely hide the pre-charge time and the activation time needed for the next memory bank's memory page. Thus, the access efficiency is improved greatly.

Although the burst length of data each time being written into the DRAM307 is 8 words in this embodiment, the burst length is not limited in the present invention. The burst length can be changed to 4 words or 16 words. However, it should be noted that if the burst length is not large enough, the pre-charge time and the activation time needed for the next memory bank's memory page cannot be hidden completely. In this case, the access efficiency is degraded.

Figure 9:
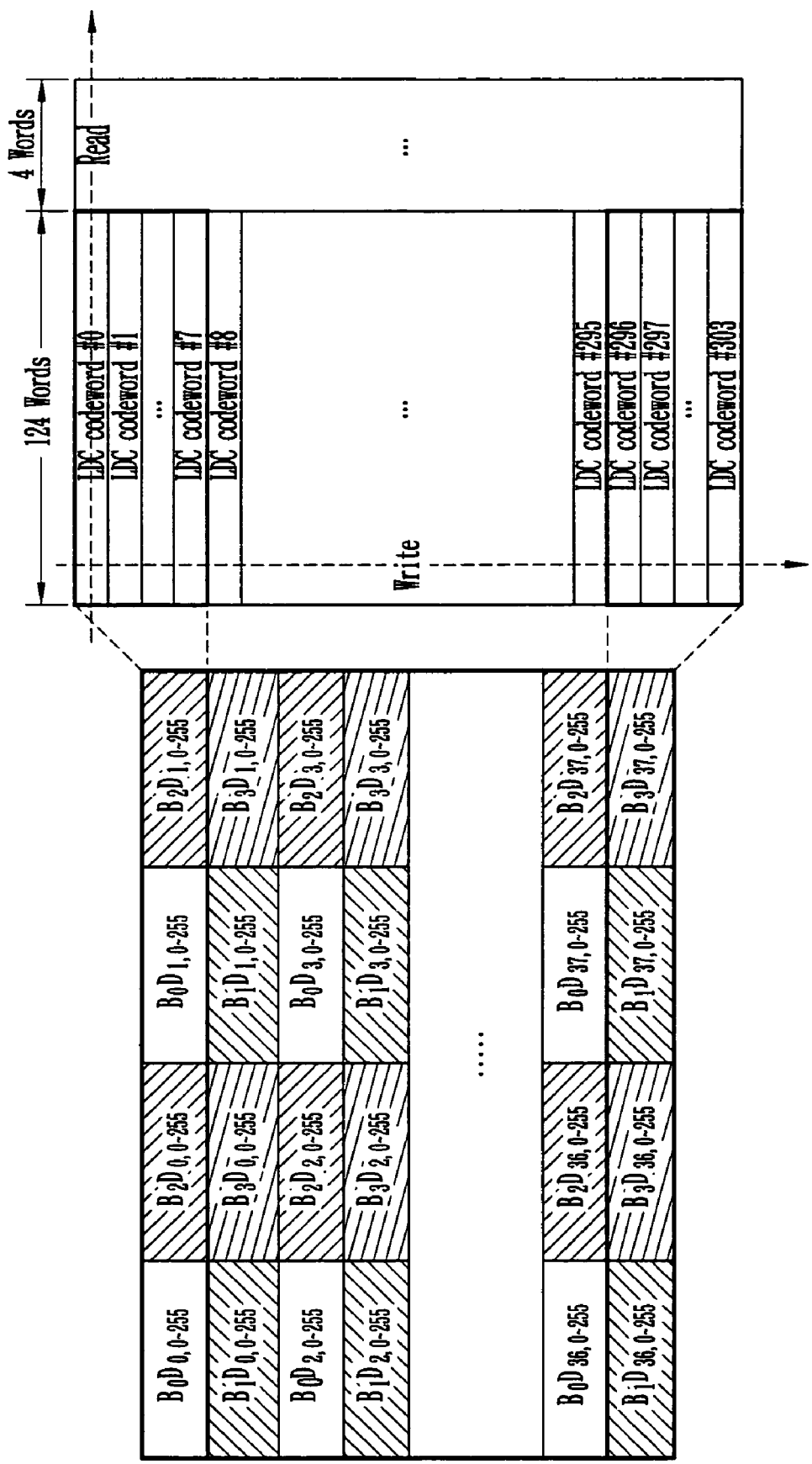
FIG. 9 shows the LDC block arranged in the DRAM.

After the accessing/transferring apparatus 300 stores a LDC block into the DRAM 307 according to the method shown in FIG. 8A and FIG. 8B, the data of the LDC block is arranged as shown in FIG. 9.

Please refer to FIG. 3 again. After the accessing/transferring apparatus 300 stores the LDC block into the DRAM 307 according to the foresaid method, it performs an error correction action and an error detection action on this data. First, the LDC data and the BIS data are delivered to the error correction decoder 309 and error detection circuit 311, the error correction decoder 309 uses the parity data of the LDC and BIS data for decoding. In this way, the error correction decoder 309 can correct errors in the LDC and BIS data. The error detection circuit 311 uses the error detection code of the data frame to perform the error detection action.

Therein, when the error correction decoder 309 performs the error correction action on the LDC data, it takes out the LDC codes #0~303 one by one for decoding. When the error correction decoder 309 accesses the ith LDC code designated as $LDC_{k,i}$, where k=0~247, it orderly reads the data stored at the memory locations designated as $B_xD_{y,8*z}$, $B_{2+x}D_{y,8*z}$, $B_xD_{y+1,8*z}$, $B_{2+x}D_{y+1,8*z}$, where x=floor(i/8) and y=2*floor(i/16), z=0~31.

Taking the 0th LDC code designated as $LDC_{k,0}$, where k=0~247, for an example, the data stored at the memory locations designated as $B_0D_{0,0}$, $B_0D_{0,8}$, $B_0D_{0,16}$, ... $B_0D_{0,8*z}$, ..., $B_0D_{0,248}$ of the Bank0 are first read out, then $B_2D_{0,0}$, $B_2D_{0,8}$, $B_2D_{0,16}$, ..., $B_2D_{0,8*z}$, ..., $B_2D_{0,248}$ of the Bank2, then $B_0D_{1,0}$, $B_0D_{1,8}$, $B_0D_{1,16}$, ... $B_0D_{1,8*z}$, ..., $B_0D_{1,248}$ of the bank 0 and finally $B_2D_{1,0}$, $B_2D_{1,8}$, $B_2D_{1,16}$, ... $B_2D_{1,8*z}$, ..., $B_2D_{1,248}$ of the bank 2, where z=0~31.

In the reading procedure for these LDC codes, after every 32 words of data, which have the same row address but have discontinuous column addresses, is accessed from the same memory bank, the present invention accesses the data of another memory bank. Since the LDC data in the same memory bank has the same row address (this means the LDC data is stored in the same memory page), the present invention uses the page-mode function to access the LDC codes. Hence, the data-reading efficiency of the present invention is increased.

Figure 10:
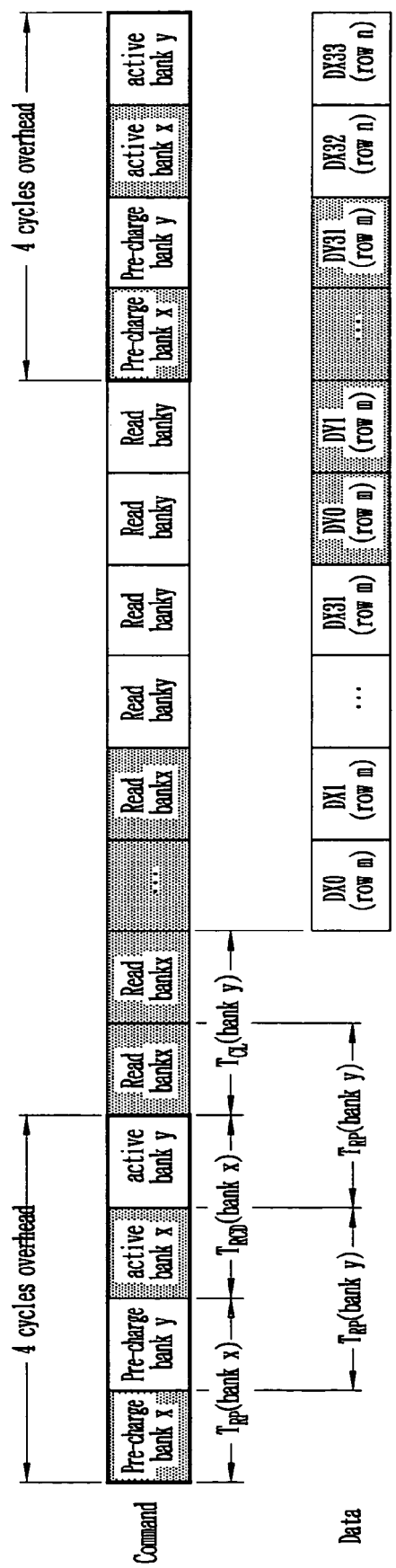
FIG. 10 is a schematic diagram showing a writing procedure for the DRAM.

Although the LCD data in the same memory bank has the same row address, they have discontinuous columns addresses. Hence, the present invention cannot perform the pre-charge action and activation action on the next memory bank in advance. But, since it is necessary to switch memory banks during data access, fifty percent of the time consumed for performing the charging or discharging action is saved (see FIG. 10). As shown in FIG. 10, if the pre-charge action and activation action are performed on two memory banks at the beginning, these two memory banks only need $(T_{rp}+T_{red})$ to complete the pre-charge action and activation action. Thus, fifty percent of the consumed time is saved.

In order to further improve the efficiency, the present invention can access eight LDC codewords at the same time and store them into an additional SRAM. Since the accessed data has continuous column addresses, the present invention uses the page-mode function to read the LDC codewords. Thus, the present invention can perform the pre-charge action and activation action on the next memory bank in advance.

When the accessing/transferring apparatus 300 finishes decoding the LDC and BIS data, it delivers the BIS data to the host interface 315. Via the host interface 315, the logical addresses and user control data of the BIS data are passed to the host computer (not shown).

Furthermore, the accessing/transferring apparatus 300 also reads out the LDC data and passes them to the de-scrambler 313 for de-scrambling. Thereby, the target data that the host computer wants to obtain is recovered. Finally, the accessing/transferring apparatus 300 passes the target data to the host computer via the host interface 315. Thereby, accessing of the optical data is completed. Therein, the transmitting interface can also be a video transmitting interface. Hence, the transferred data that has been decoded is video data.

It should be noted that, in the reading procedure of the LDC data, the accessing/transferring apparatus 300 also uses the method mentioned above and the page-mode function of the DRAM 307 to read the LDC data of the memory banks to improve the access efficiency of the present invention.

Figure 11:
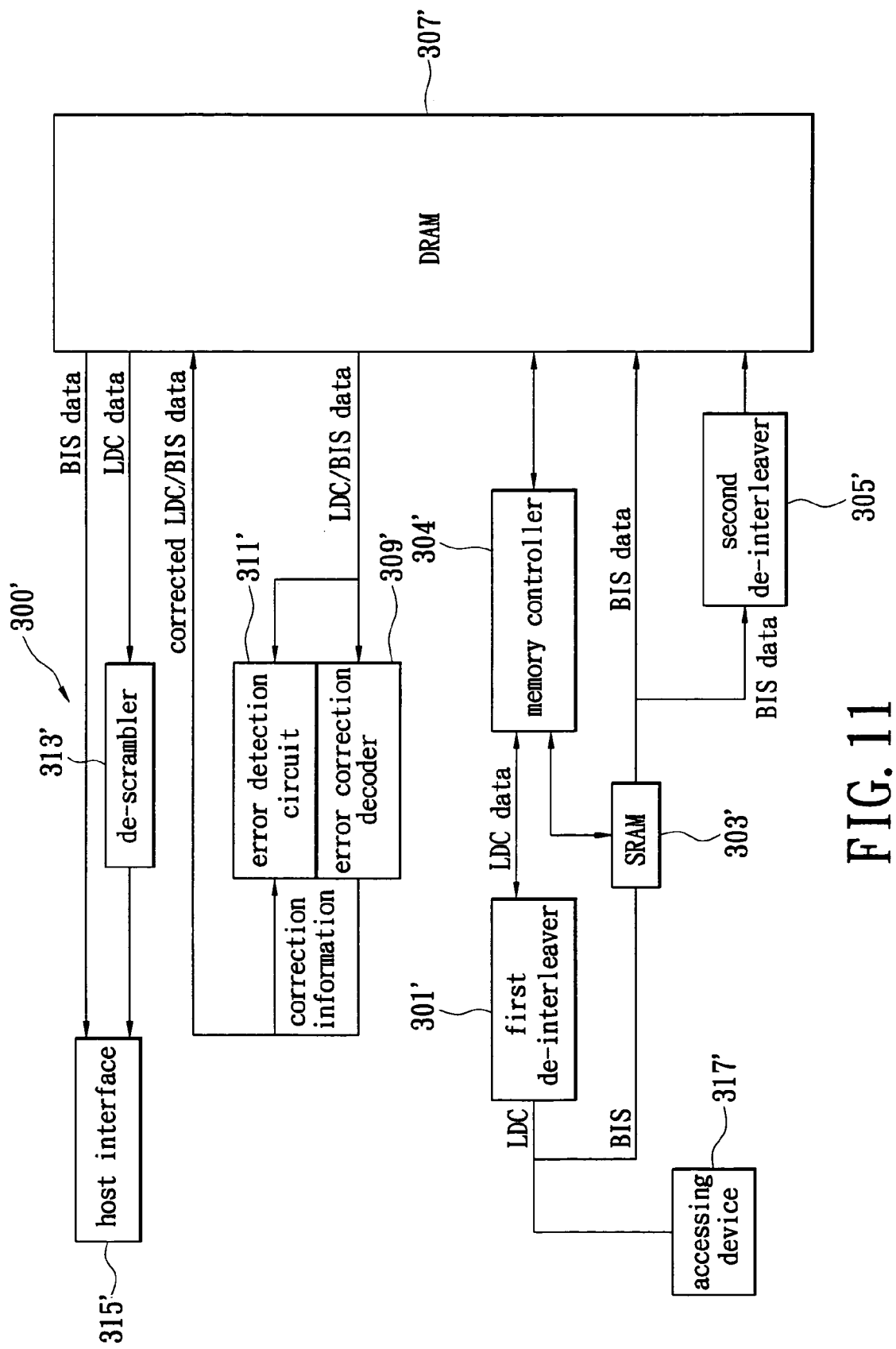
FIG. 11 is a block diagram of the second preferred embodiment.

Reference is made to FIG. 11, which is a block diagram of the second preferred embodiment. The accessing/transferring apparatus 300' includes a first de-interleaver 301', a SRAM 303', a memory controller 304', a second de-interleaver 305', a DRAM 307', an error correction decoder 309', an error detection circuit 311', a de-scrambler 313', a host interface 315' and an accessing device 317'.

The operation of the second embodiment is similar to that of the first embodiment. Thus, the components that have the same operation are not described again. Only the differences between these two embodiments are detailed below. The main difference between the first and second embodiments is that the SRAM 303' of the second embodiment is only used to store the BIS data. Furthermore, since the LDC data is not stored temporarily in the SRAM 303', the first de-interleaver 301' can only be used to perform one kind of de-interleaving operation, i.e. SHIFT 3 (the first one of the de-interleaving operations for LDC data).

Figure 1:
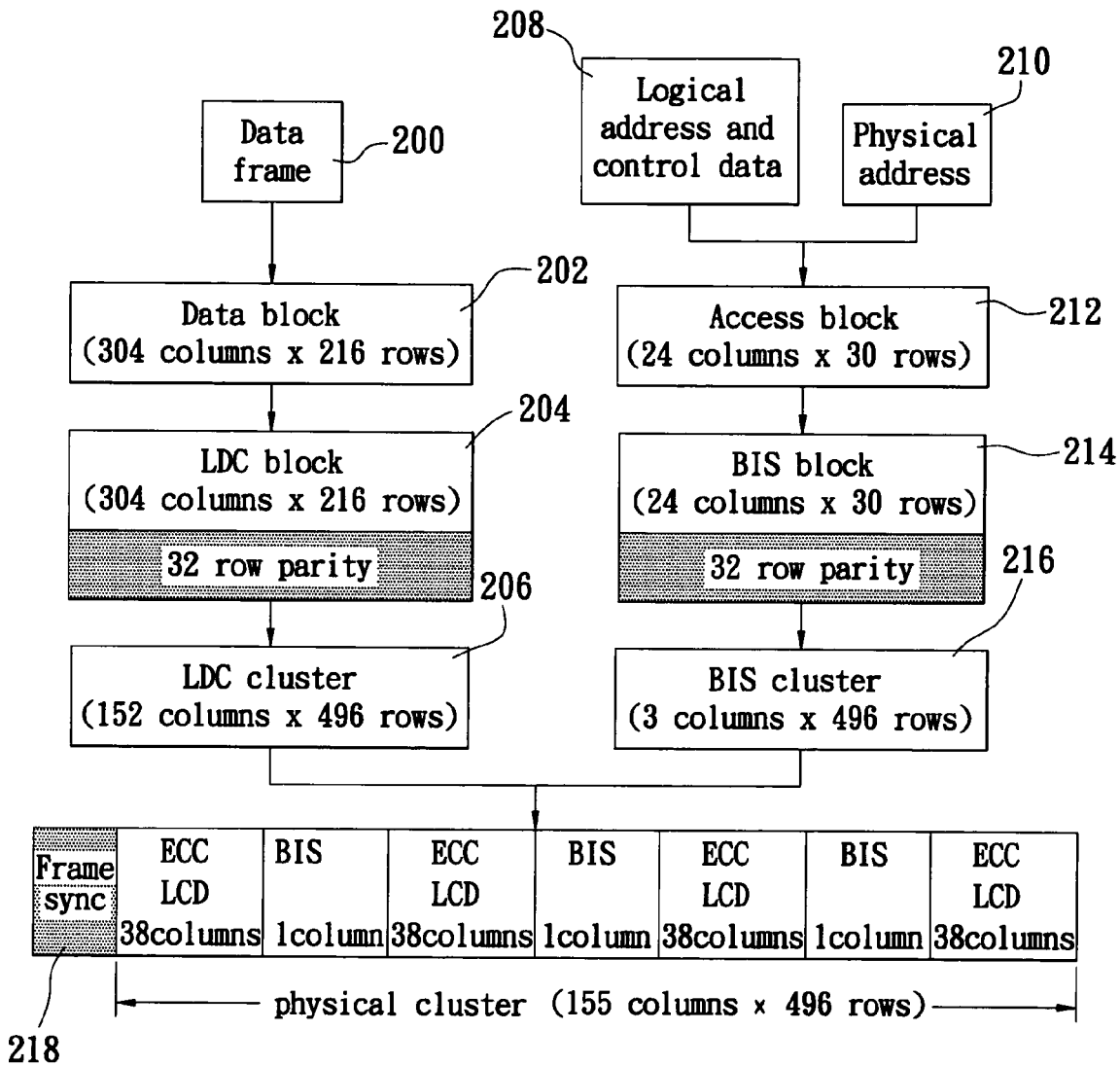
FIG. 1 shows a flowchart diagram illustrating the decoding process of the Blu-ray disk.
Figure 2:
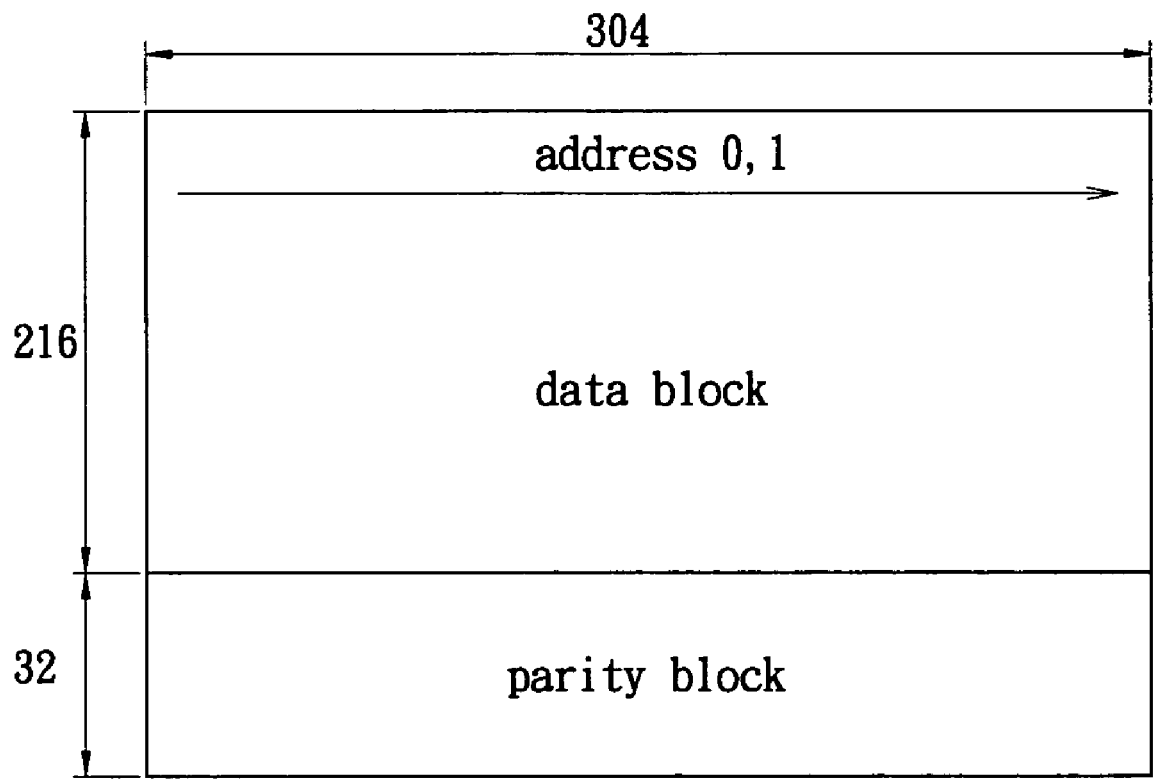
FIG. 2 is a diagram for showing the arrangement of the LDC data stored in the DRAM in compliance with the prior art.

Therein, the first de-interleaver 301' first calculates the addresses of DRAM 307' for storing the LDC data. Then, the memory controller 304' directly writes the LDC data into the DRAM 307' according to a specific address arrangement, wherein the LDC data is the LDC cluster 206 shown in FIG. 1. The LDC cluster 206 is a data matrix with 152 columns and 496 rows and formed by interleaving the LDC block twice. Thus, due to the specific address arrangement, the proportion for data columns of the LDC block written in the same memory bank is higher than or equal to that for data rows. In this way, the access efficiency of LDC block is improved.

Figure 12:
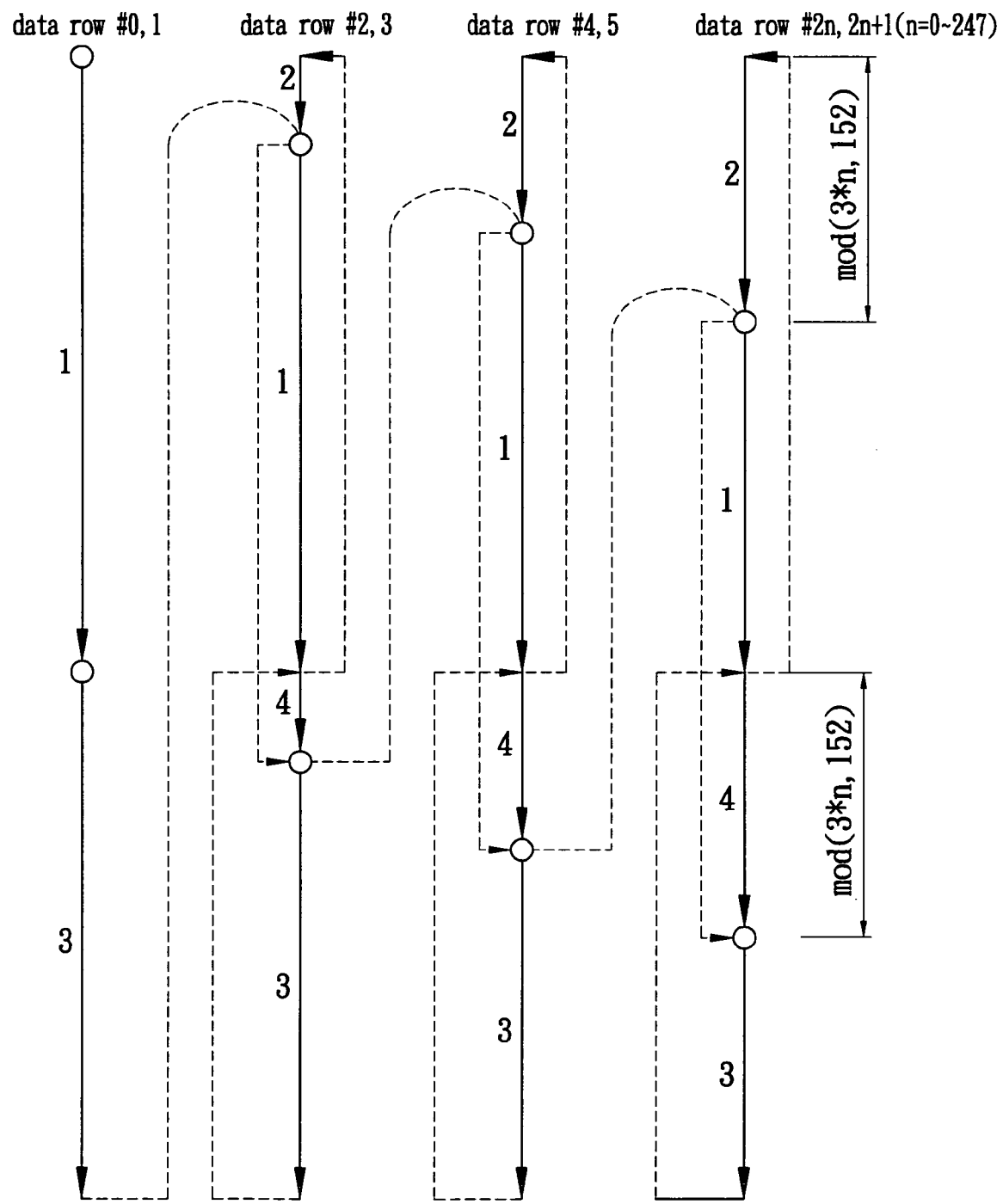
FIG. 12 is a schematic diagram showing a procedure for storing the LDC cluster into the DRAM.

Reference is made to FIG. 12, which is a schematic diagram showing a procedure for storing the LDC cluster into the DRAM. Therein, the first bytes of data rows of the LDC cluster are respectively represented as circles. The LDC data is orderly stored according to the orientation of the arrows. The arrows with solid lines are used to represent the data writing order and the arrows with dash lines point to the next storing addresses. The numbers beside the arrows represent the storing order of the data rows. The data rows with smaller numbers are stored earlier than those with larger numbers.

As shown in FIG. 12, after the first de-interleaver 301' performs the de-interleaving operation, the first bytes of the data rows of the LDC cluster are not arranged in the same vertical position of the DRAM 307'. Every time two data rows are stored, three bytes are shifted. Thus, the present invention divides each of the data rows of the LDC cluster into two portions to perform the writing procedure. Taking the data row #2 and data row #3 as an example, the data row #2 is divided into two portions, which are represented by the solid arrows designated with numerical one and two. Similarly, the data row #3 is also divided into two portions, which are represented by the solid arrows designated with numerical three and four. The data of the data row #2 and the data row #3 are orderly stored into the DRAM 307' according to the numerical designation of the arrows from numerical one through numerical four.

In the second embodiment, since the arrangement of the logical memory sections for storing the LDC data can be the one shown in FIG. 8A and FIG. 8B, the memory banks of the DRAM 307' are divided individually into multiple logical memory sections, each of which forms a 8×32 matrix. Each element of the 8×32 matrix is a word (i.e. two bytes). Comparing FIG. 8A with FIG. 12, it is known that, except for the data rows #0~1 of the LDC cluster, each of the first bytes of the data rows of the LCD cluster has an offset. Thus, except for the data rows #0~1 of the LDC cluster, the data of each of the data rows stored in the first memory banks or the last memory banks is less than eight bytes. This means the length of the data written continuously is insufficient to completely hide the pre-charge time and the activation time of the next memory bank. Thus, the improvement of the writing efficiency is limited.

For each of the data rows, the first memory bank and the last memory bank are actually the same and the total amount of data for the first and last memory banks is eight words exactly. Thus, in order to further improve the efficiency of the present invention, an extra memory unit capable of storing sixteen bytes of data (i.e. eight words of data), e.g. a first-in-first-out memory (FIFO memory), can be used in the second embodiment to store data for the first and last memory banks in advance. Then, after the other portion of the data row is stored in the DRAM 307', the data stored in the extra memory unit is read and stored in the DRAM 307'. In this way, the amount of data stored in every memory bank is exact eight words. Thus, the pre-charge time and the activation time of the next memory bank and memory page are completely hidden and the efficiency of the present invention is further improved.

Figure 13:
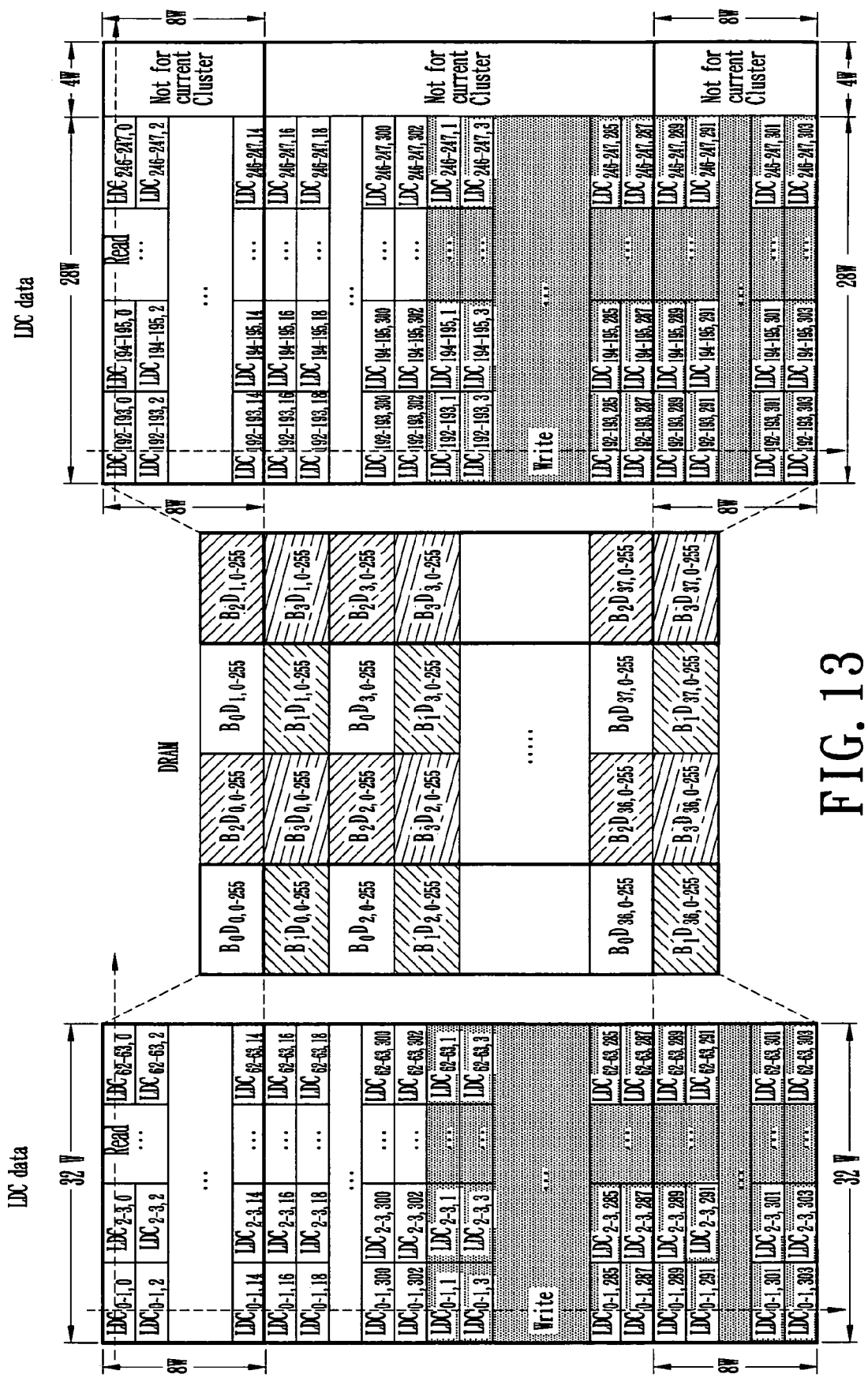
FIG. 13 is a schematic diagram showing a strategy for storing LDC data of the SARM into the DRAM.

Reference is made to FIG. 13, which is a schematic diagram showing a strategy for storing LDC data of the SARM into the DRAM. As shown in the figure, when the LDC block is completely stored in the DRAM 307', the first interleaving operation is completed. Since the first de-interleaver 301' can only perform the first interleaving operation, the data of the LDC codewords with odd numerical designations and the data with even numerical designations still stay apart. As shown in FIG. 13, the upper portion (with white color) of the LDC data has even numerical designations and the lower portion (with gray color) has odd numerical designations.

It should be noted that, in the data writing strategy of the second embodiment mentioned above, the amount of data written into the DRAM 307' is one byte. The capacity of a single memory unit, which owns a memory address, of the DRAM 307' is not considered in the second embodiment. If the capacity of a single memory unit of the DRAM 307' is N bytes, where N is an integer equal to or larger than one, the writing strategy mentioned above causes each memory unit of the DRAM 307' to be written N times.

For further improving the writing efficiency, if the capacity of the memory units of the DRAM 307' is N bytes, the second embodiment can first combine N bytes of data of a LDC codeword and then store the data into the DRAM 307' together. This means that, according to the order shown in FIG. 12, the second embodiment can continuously read out N bytes of data of a data row of a LDC cluster (the data belongs to different LDC codewords respectively) and store the data into one memory unit of the DRAM 307'.

Figure 14:
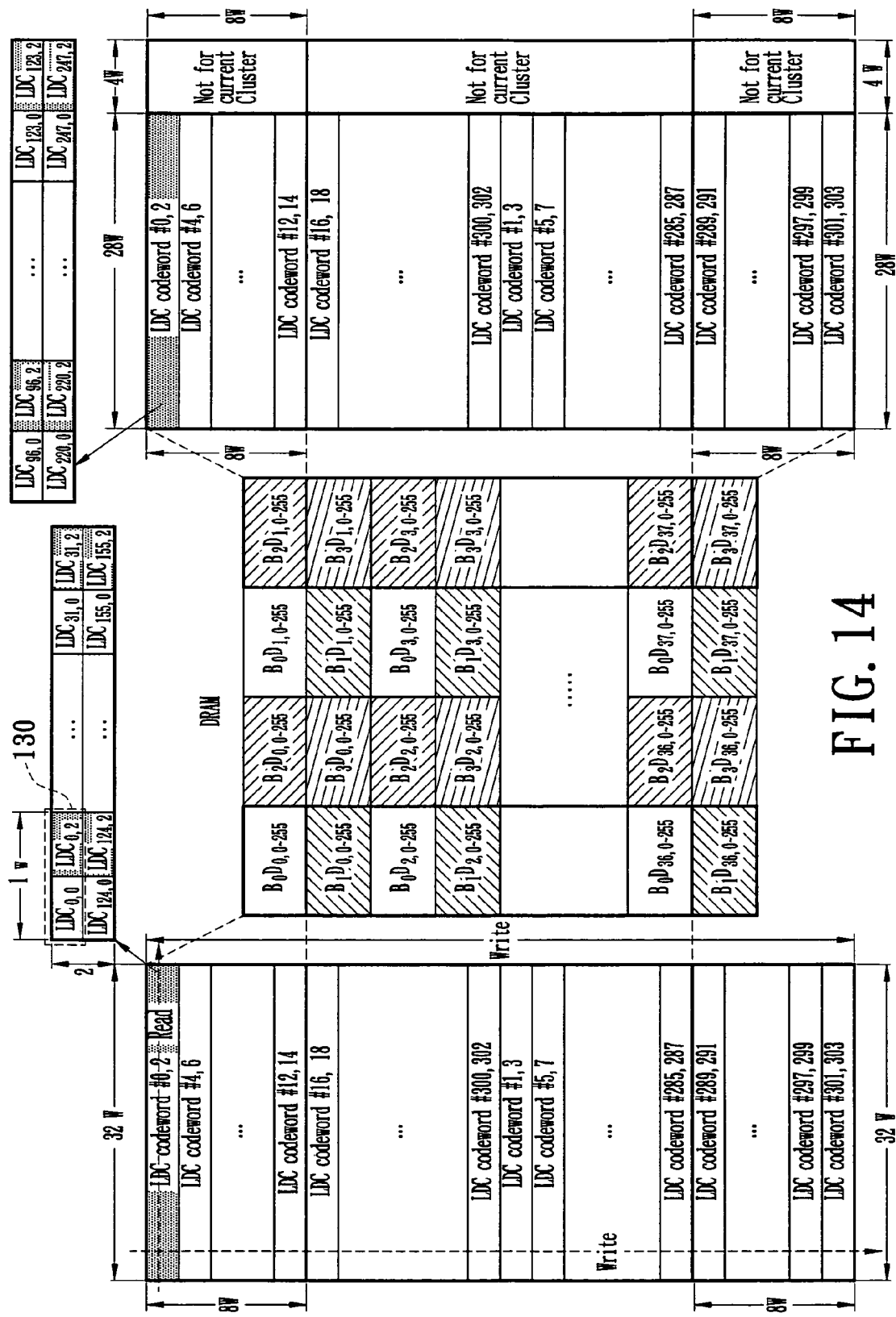
FIG. 14 is a schematic diagram showing the arrangement of the LDC data stored in the DRAM.

Reference is made to FIG. 14, which is a schematic diagram showing the arrangement of the LDC data stored in the DRAM. In order to clarify the method for combining N bytes of data of the LDC codewords, FIG. 14 shows an arrangement strategy of the logical memory sections for storing a LDC block as N=2. As shown in the figure, each of the memory banks of the DRAM 307' is divided into multiple logical memory sections, each of which forms an 8×32 matrix. Each of the elements of the matrix is a word.

When N=2, according to the writing order shown in FIG. 12, the present invention reads two bytes of data continuously from a data row of a LDC cluster (the data belongs to different LDC codewords respectively) and stores the data into one memory unit of the DRAM 307'. The second embodiment of the present invention makes every eight bytes of data form a group. Every time a group of eight bytes of data is stored into a memory page of a memory bank, the accessing/transferring apparatus 300' uses another memory page of another memory bank to store the following eight bytes of data.

However, as shown in FIG. 14, the method of first combining N bytes of LDC data and then writing them into the DRAM makes N LDC codewords become interleaved together. For example, the data designated as $LDC_{0,0}$ and $LDC_{0,2}$ circled by a dash line 130 in FIG. 14 belongs to different LDC codewords. Hence, every time the LDC data is accessed, the data of N LDC codewords is accessed together because the strategy of the present invention is to read a column of 32 bytes of data of a logical memory section along a horizontal direction every time. Thus, if the method of combining N bytes of LDC data is used, the error correction decoder 309' and error detection circuit 311' used are capable of processing N LDC codewords. Thus, the access frequency of the DRAM 307' is reduced. However, the present invention has no limit to the number of codewords that can be processed.

Figure 15:
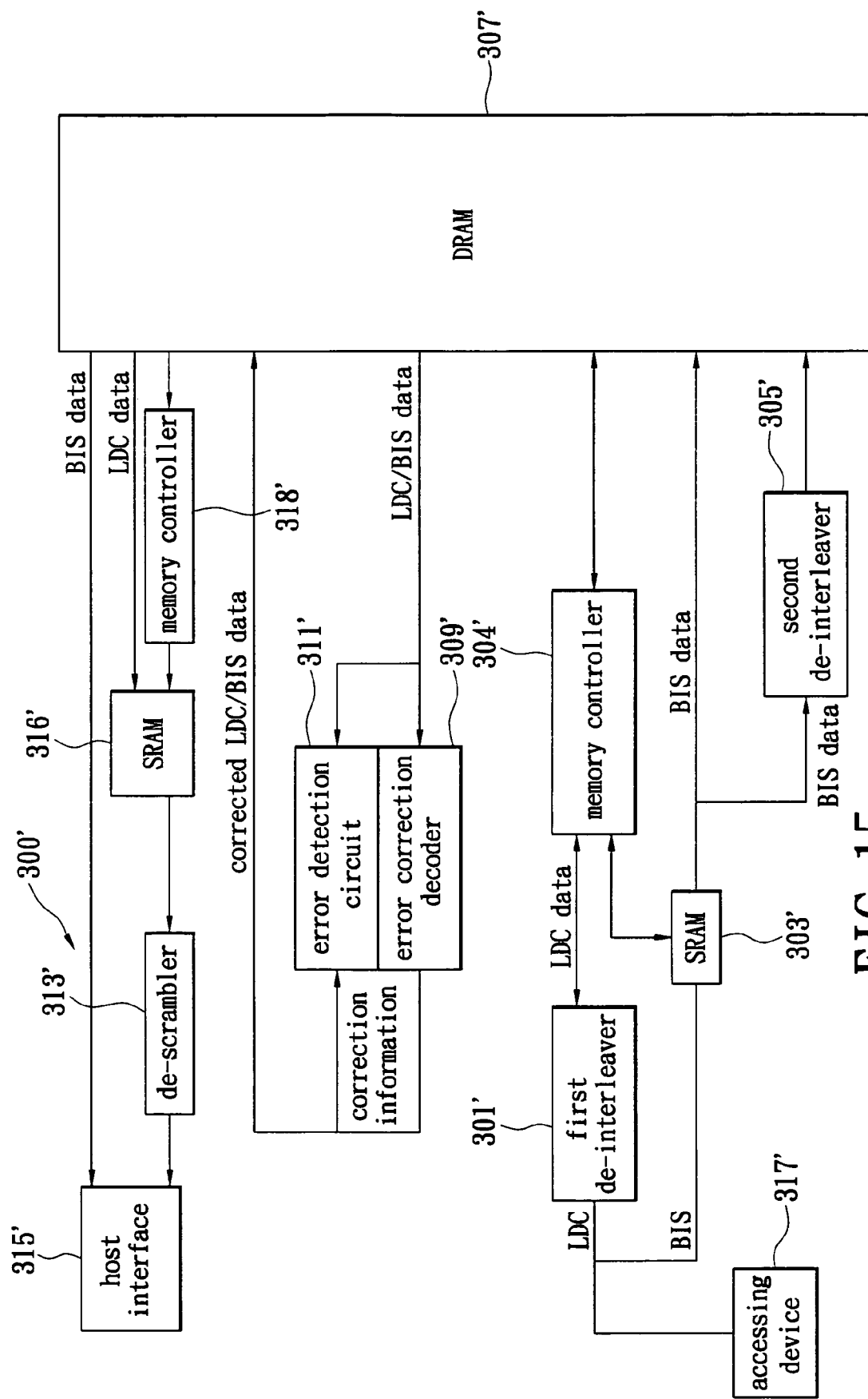
FIG. 15 is a block diagram of another embodiment.

Furthermore, when the data is transmitted to the host, the LDC codewords need to be sent out one by one. Hence, if the method of combing N bytes LDC data is used, as shown in FIG. 15, an additional SRAM 316' and memory controller 318' are needed to store the data that is accessed but not sent out so as to further reduce the access frequency of the DRAM 307'.

Figure 16:
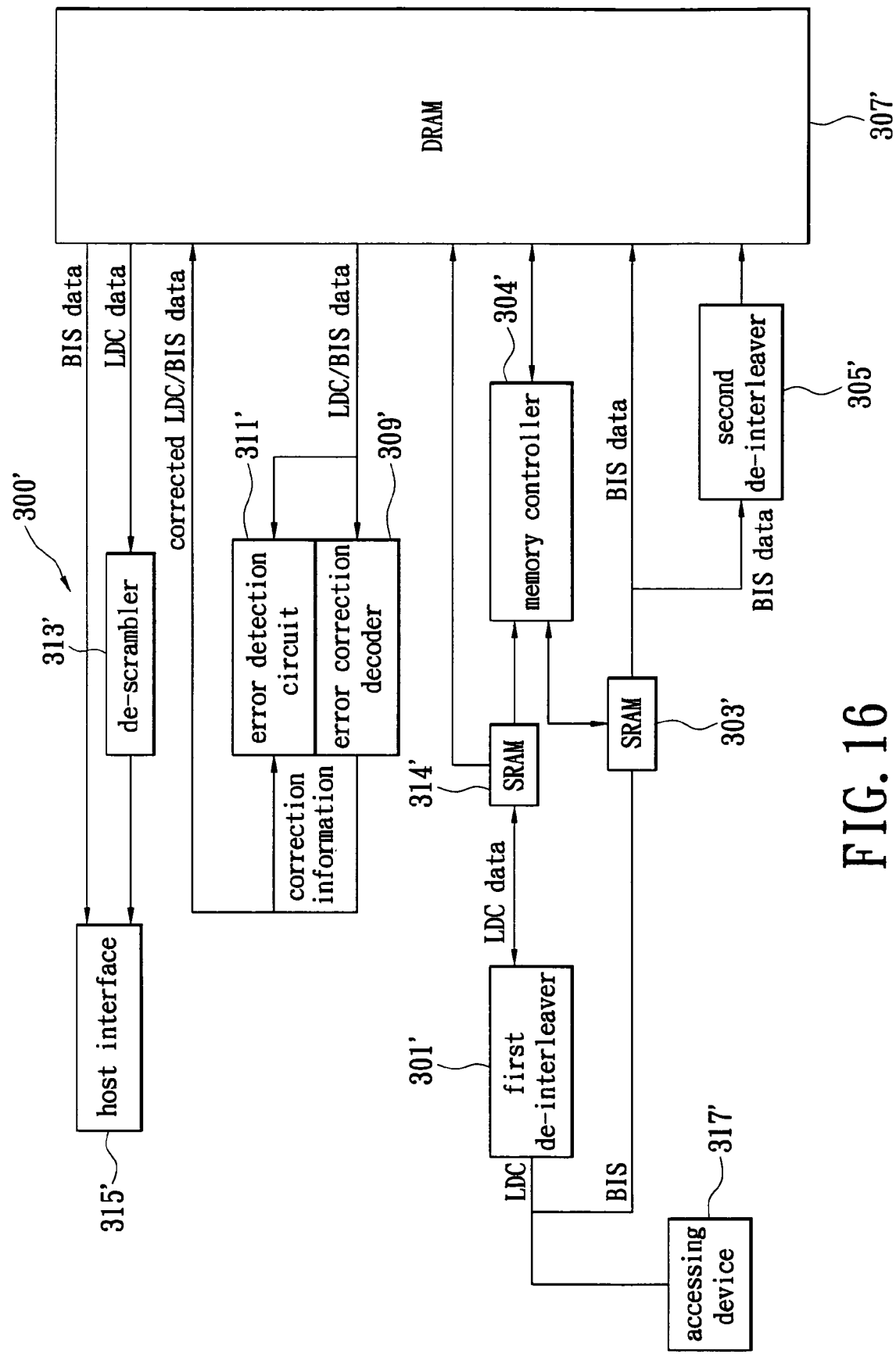
FIG. 16 is a block diagram of another embodiment.

In addition, as shown in FIG. 16, in order to further improve the writing efficiency, the second embodiment of the present invention uses an additional SRAM 314' to combine N bytes of data of a LDC codeword and then writes the data into the DARM 307'. This means that (N−1) data rows of LDC cluster are first accessed and stored in the SRAM 314'. Then, when the Nth data rows of the LDC cluster are accessed, every byte of the Nth data row is combined with the other (N−1) bytes of data belonging to the same LDC codeword that is stored in the SRAM 314', and then the combined N bytes of data is stored into a memory unit of the DRAM 307'. Therein, in order to achieve optimal efficiency, the SRAM 317' should be capable of accommodating at least (N×1)×2 data rows of the LDC cluster. For example, N=2, the SRAM 317' should be capable of accommodating at least 304 bytes of data.

It should be noted that compared with the SRAM 303 of the first embodiment, the SRAM 314' needed in this embodiment has a smaller capacity. For example, in case of N=2, the SRAM 303 must be capable of accommodating at least 604 bytes of data and the SRAM 314' only needs to accommodate 304 bytes of data. Hence, the hardware needed for the second embodiment is cheaper.

Figure 17A:
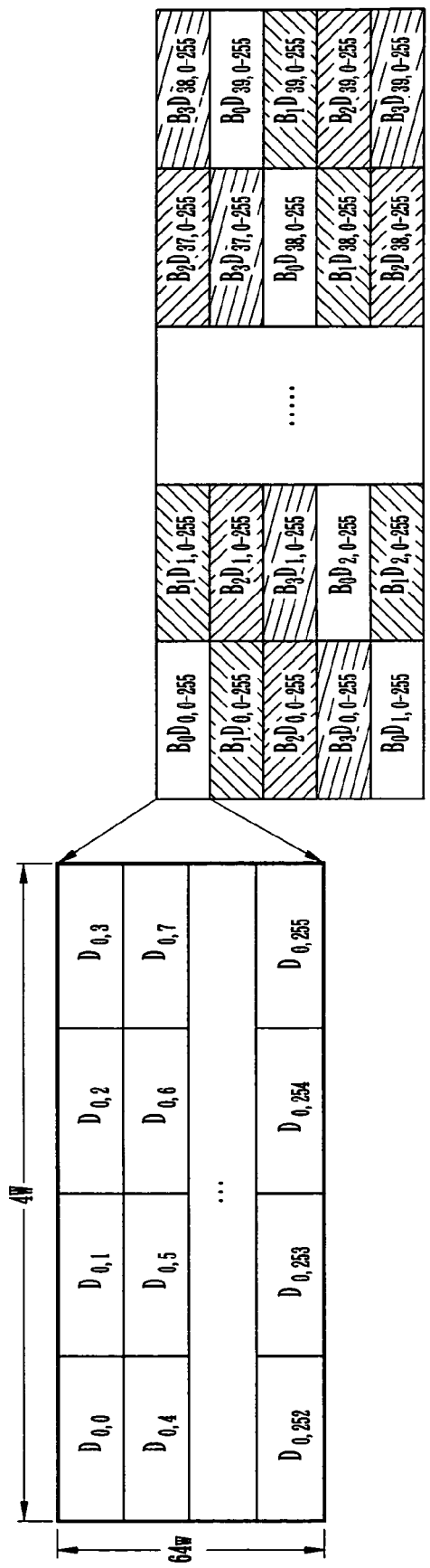
FIG. 17a shows another arrangement of logical memory sections of the DRAM.
Figure 17B:
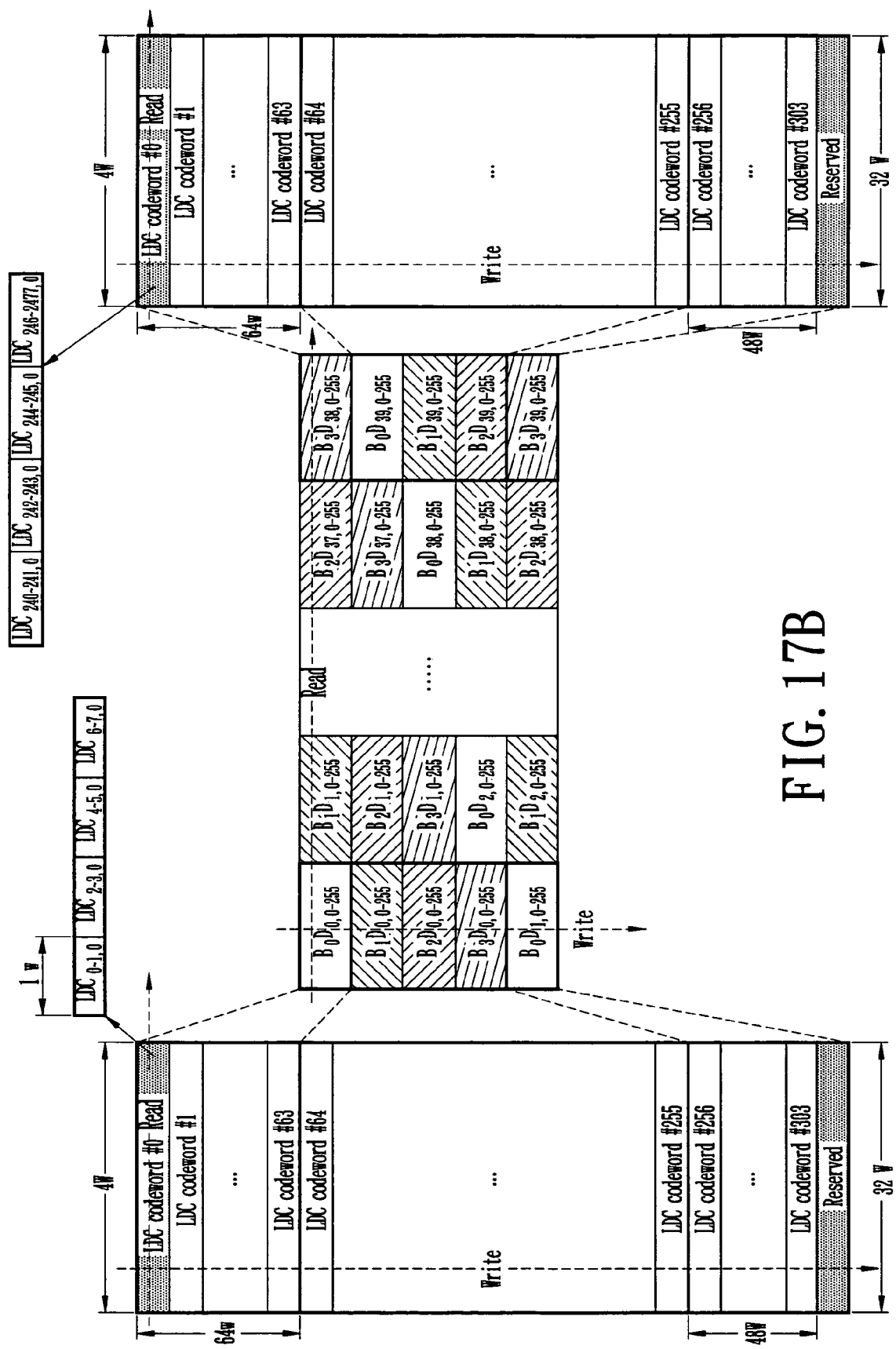
FIG. 17b shows another method for storing LDC data into the DRAM.

Reference is made to FIGS. 17a and 17b. FIG. 17a shows another arrangement of logical memory sections of the DRAM. FIG. 17b shows another method for storing LDC data into the DRAM. The circuits and operations of the third embodiment of the present invention is substantially the same as that of the first embodiment. The only difference is the arrangement of the logical memory sections of the DRAM 307. In the third embodiment, each of the memory banks of the DRAM 307 is divided into multiple logical memory sections for storing the data of a LDC block. Each of the logical memory sections forms a 64×4 matrix and every element of the logical memory sections is a word (i.e. two bytes). It should be noted that, in practice, the present invention is not limited to the manner of the logical memory sections formed in the third embodiment.

In this embodiment, the burst length of data being written each time into the DRAM307 is 64 words. As shown in FIG. 17B, every 64 words of data form a group in this embodiment. Every time 64 words of data are written into a logical memory section of a memory bank in a horizontal direction, the accessing/transferring apparatus 300 uses another memory page of another memory bank to store the following 64 words of data. After the writing procedure is completed, the data of the LDC block are arranged in the DRAM 307 as shown in FIG. 9.

As shown in FIG. 17a, since the 64 bytes of data written in the same memory bank have the same row address (this means the data belongs to the same memory page), the present invention uses the page-mode function to store the LDC data into the memory banks. Thus, the access efficiency of the present invention is improved.

Although the 64 bytes of LCD data have the same row address, they have discontinuous column addresses. Hence, the present invention cannot perform the pre-charge action and activation action on the next memory bank in advance. But, since it is necessary to switch memory banks during data access, fifty percent of the time consumed for performing the charging or discharging action is saved (see FIG. 10). As shown in FIG. 10, if the pre-charge action and activation action are performed on two memory banks at the beginning, these two memory banks only need $(T_{rp}+T_{red})$ to complete the pre-charge action and activation action. Thus, fifty percent of the consumed time is saved.

In order to further improve the writing efficiency of the third embodiment, the chosen SRAM 303 should be capable of accommodating eight data rows of the LDC block, i.e. 304×8 bytes. Thus, the chosen SRAM 303 can be used to store eight data rows of the LDC block in advance and then write the data into the same logical memory section of the DRAM 307. Meanwhile, since the written data has continuous column addresses, the present invention uses the page-mode function to store the LDC codewords into the present memory bank and perform the pre-charge action and activation action on the next memory bank.

Furthermore, in this embodiment, since the length of the data accessed from the DRAM 307 each time is four words, as shown in FIG. 17b, every four words form a group in this embodiment. Hence, every time four words of data are accessed from a logical memory section of a memory page in a horizontal direction, the accessing/transferring apparatus 300 activates another memory bank's memory page for accessing the next group's data.

In this embodiment, since four words of data are accessed from the same memory bank at each access action (the data is located at the same memory page and has continuous memory addresses), the time consumed for accessing a memory bank is sufficient to complete the pre-charge action and activation action of the next memory bank's memory page. Thus, the pre-charge time and activation time needed for the memory banks and memory pages are completely hidden. Hence, the data access efficiency of the present invention is greatly improved.

Please refer to FIGS. 17a and 17b again. The circuits and operations of the four embodiments of the present invention are substantially the same as that of the second embodiment. The only difference is the arrangement of the logical memory sections of the DRAM 307'. In the fourth embodiment, each of the memory banks of the DRAM 307 are divided into multiple logical memory sections for storing the data of a LDC block. Each of the logical memory sections forms a 64×4 matrix and every element of the logical memory sections is a word (i.e. two bytes). It should be noted that, in practice, the present invention is not limited to the manner of the logical memory sections formed in this embodiment. The only requirement is that the proportion for data rows of the LDC block written in the same memory bank is higher than or equal to that for the data columns.

In this embodiment, the SRAM 303' is only used to store the BIS data. Since the LDC data is not temporarily store in the SRAM 303', the first de-interleaver 301' can only be used to perform one kind of de-interleaving operation. Therein, the first de-interleaver 301' first calculates the addresses of the DRAM 307' for storing the LDC data. Then, the memory controller 304' directly writes the LDC data into the DRAM 307' according to a specific address arrangement. Thereby, the proportion of data rows of the LDC block written in the same memory bank is higher than or equal to that for the data columns. Thus, the access efficiency of the LDC block is improved.

As shown in FIG. 12, after the first de-interleaver 301' performs the de-interleaving operation, the first bytes of the data rows of the LDC cluster are not arranged in the same vertical position of the DRAM 307'. Thus, the present invention divides each of the data rows of the LDC cluster into two portions to perform the writing procedure.

In the fourth embodiment, the arrangement of the logical memory sections of the DRAM 307' for storing the data of the LDC block can be the one shown in FIG. 17A and FIG. 17B. In this embodiment, every 64 words of data form a group. Every time 64 words of data are written into a logical memory section of a memory bank, the accessing/transferring apparatus 300 uses another memory page of another memory bank to store the following 64 words of data.

Figure 18:
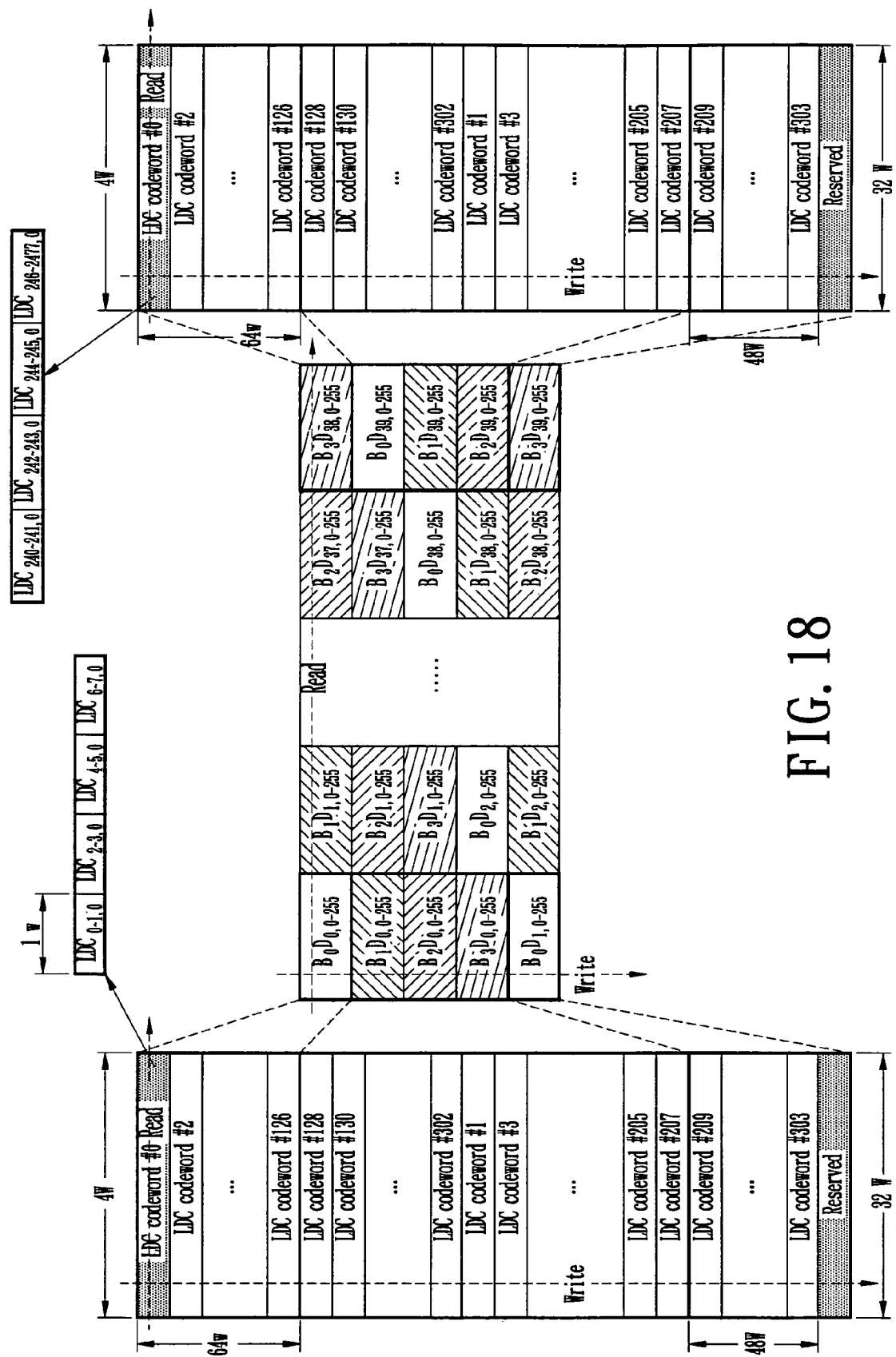
FIG. 18 shows the LDC block arranged in the DRAM.

After the writing procedure is completed, the data of the LDC block is arranged in the DRAM 307 as shown in FIG. 18. As shown in FIG. 17b, since the 64 bytes of data written in the same memory bank have the same row address, the present invention uses the page-mode function to store the LDC data into the memory banks. Thus, the access efficiency of the present invention is improved.

As shown in the FIG. 18, when the LDC block is completely stored in the DRAM 307', the first interleaving operation is completed. Since the first de-interleaver 301' can only perform the first interleaving operation, the data of the LDC codewords with odd numerical designations and those with even numerical designations still stay apart.

It should be noted that, in the data writing strategy of the fourth embodiment mentioned above, the amount of the data written into the DRAM 307' is one byte. The capacity of a single memory unit, which owns a memory address, of the DRAM 307' is not considered. If the capacity of a single memory unit of the DRAM 307' is N bytes, where N is an integer equal to or larger than one, the writing strategy mentioned above causes each of the memory unit of the DRAM 307' to be written N times.

If the capacity of the memory units of the DRAM 307' is N bytes, for further improving the writing efficiency, the fourth embodiment can first combine N bytes of data of a LDC codeword and then store the data into the DRAM 307' together. This means that, according to the order shown in FIG. 12, the second embodiment can continuously read out N bytes of data of a data row of a LDC cluster and store the data into one memory unit of the DRAM 307'.

Figure 19:
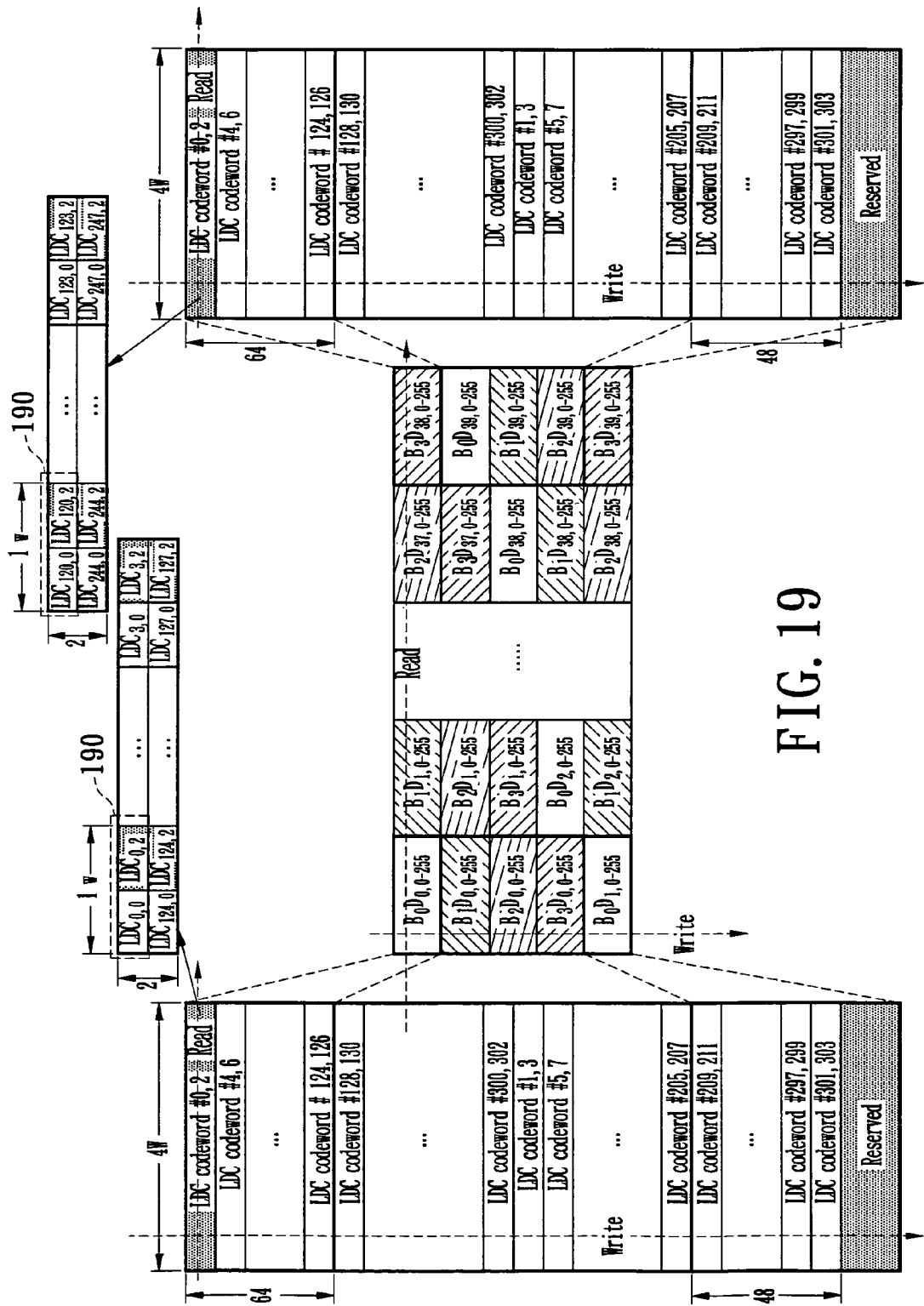
FIG. 19 shows the LDC block arranged in the DRAM.

Reference is made to FIG. 19, which is another schematic diagram showing the arrangement of the LDC data stored in the DRAM. In order to clarify the method of combining N bytes of data of the LDC codewords, FIG. 19 shows an arrangement strategy of the logical memory sections for storing a LDC block as N=2. As shown in the figure, each of the memory banks of the DRAM 307' is divided into multiple logical memory sections, each of which forms a 64×4 matrix. Each of the elements of the matrix is a word.

When N=2, according to the writing order shown in FIG. 12, the present invention reads two bytes of data continuously from a data row of a LDC cluster (the data belongs to different LDC codewords respectively) and stores the data into one memory unit of the DRAM 307'. The fourth embodiment of the present invention makes every 64 bytes of data form a group. Every time a group of 64 bytes of data is stored into a logical memory section of a memory bank, the accessing/transferring apparatus 300' uses another logical memory section of another memory bank to store the following 64 bytes of data. Hence, according to the arrangement and writing order shown in FIG. 18 and FIG. 12, the LDC data is arranged in the DRAM 307' as shown in FIG. 19.

However, as shown in FIG. 19, the method of first combining N bytes LDC data and then writing it into the DRAM makes the N LDC codewords become interleaved together. For example, the data designated as $LDC_{0,0}$ and $LDC_{0,2}$ or $LDC_{120,0}$ and $LDC_{120,2}$ circled by a dash line 190 in FIG. 19 belongs to different LDC codewords. Hence, every time the LDC data is accessed, the data of N LDC codewords is accessed together because the strategy of the present invention is to read a column of 32 bytes of data of a logical memory section in a horizontal direction every time. Thus, if the method of combining N bytes LDC data is used, the error correction decoder 309' and error detection circuit 311 ' used can be the same ones capable of processing N LDC codewords. Thus, the access frequency of the DRAM 307' is reduced. However, the present invention has no limit to the number of codewords that can be processed.

Furthermore, when the data is transmitted to the host, the LDC codewords need to be sent out one by one. Hence, if the method of combing N bytes LDC data is used, as shown in FIG. 15, an additional SRAM 316' and memory controller 318' are needed to store the data that is accessed but not sent out to further reduce the access frequency of the DRAM 307'.

In addition, as shown in FIG. 16, in order to further improve the writing efficiency, the fourth embodiment of the present invention can use an additional SRAM 314' to combine N bytes of data of a LDC codeword and then write the data into the DARM 307'. This means that (N−1) data rows of LDC cluster are first accessed and stored in the SRAM 314'. Then, when the Nth data rows of the LDC cluster are accessed, every byte of the Nth data row is combined with the other (N−1) bytes of data belonging to the same LDC codeword that is stored in the SRAM 314', and then the combined N bytes of data are stored into a memory unit of the DRAM 307'.

Therein, in order to achieve optimal efficiency, the SRAM 317' should be capable of accommodating at least (N×1)×2 data rows of the LDC cluster. For example, if N=2, the SRAM 317' should be capable of accommodating at least 304 bytes of data. It should be noted that compared with the SRAM 303 of the first embodiment or the third embodiment, the SRAM 314' needed for this embodiment has a smaller capacity.

Although the present invention has been described with reference to the preferred embodiment thereof, it is understood that the invention is not limited to the details thereof. Various substitutions and modifications have been suggested in the foregoing description, and other will occur to those of ordinary skill in the art. Therefore, all such substitutions and modifications are embraced within the scope of the invention as defined in the appended claims.

What is claimed is:

1. An apparatus for accessing and transferring optical data, the apparatus performing an error correction process on an error correction block, and the error correction block comprising a data matrix with a plurality of columns and a plurality of rows, wherein each column of the data matrix is a decoding set the data matrix is recorded on an optical storage medium in a row direction to form an error correction modulation block, and an data arrangement order of the error correction modulation block has a relation to a data arrangement order in the rows of the error correction block, the apparatus comprising: a first memory used to store the data of the error correction block, the first memory having a plurality memory banks and supporting a page-mode function and an alternate-bank-access function, each of the memory banks having a plurality of logical memory sections, each of the logical memory sections forming a memory matrix having M memory columns and N memory rows, and the memory matrix being formed by memory units located at a common memory page, wherein M and N are natural numbers and each of the memory columns has a predetermined number of the memory units that have consecutive addresses; a memory controller used to control the first memory, the memory controller using the alternate-bank-access function of the first memory to access the data matrix of the error correction block along the row direction of the data matrix and write each row of the data matrix into the logical memory sections along a column direction of the logical memory sections, thus each column of the data matrix of the error correction block accessed from the optical storage medium being stored into the logical memory sections along a row direction of the logical memory sections; an error correction decoder using the page-mode function of the first memory to access each column of the data matrix of the error correction block from the logical memory sections along the row direction of the logical memory sections; and a transmission interface using the page-mode function of the first memory to access each column of the data matrix of the error correction block, which has been corrected, from the logical memory sections along the row direction of the logical memory sections and then output the same.

2. The apparatus as claimed in claim 1, wherein the error correction block includes target data and parity data.

3. The apparatus as claimed in claim 1, wherein the error correction block is a long distance error correction code (LDC) block or a burst indicator subcode (BIS) block.

4. The apparatus as claimed in claim 1, wherein the first memory is a synchronous dynamic random access memory (SDRAM).

5. The apparatus as claimed in claim 1, further comprising an error detection circuit to detect whether the data in the error correction block is correct or not by using the data accessed by the error correction decoder.

6. The apparatus as claimed in claim 1, wherein the transmission interface is a de-scrambler used to de-scramble the data of the error correction block.

7. The apparatus as claimed in claim 1, wherein the transmission interface is a video or audio interface used to transmit video or audio data.

8. The apparatus as claimed in claim 1, wherein the transmission interface is a host interface used to transmit the data of the error correction block to a host computer.

9. The apparatus as claimed in claim 1, further comprising an accessing device to access the error correction block from the optical storage medium.

10. The apparatus as claimed in claim 9, further comprising a de-interleaver to perform a de-interleaving operation on the error correction modulation block accessed from the optical storage medium to recover the error correction block.

11. The apparatus as claimed in claim 10, further comprising a second memory capable of storing at least two rows of the data matrix of the error correction block, the second memory being connected to the de-interleaver to store the de-interleaved data of the error correction block temporarily.

12. The apparatus as claimed in claim 11, wherein the second memory is a static random access memory (SRAM).

13. The apparatus as claimed in claim 1, wherein each of the memory units is capable of storing a word, wherein the size of the word is 2 bytes.

14. An apparatus for accessing and transferring optical data, the apparatus performing an error correction process on an error correction block, and the error correction block comprising a data matrix with a plurality of columns and a plurality of rows, wherein each column of the data matrix is a decoding set, the data matrix is recorded on an optical storage medium in a row direction to form an error correction modulation block, and a data arrangement order of the error correction modulation block is related to a data arrangement order in the rows of the error correction block, the apparatus comprising: a first memory used to store the data of the error correction block, the first memory having a plurality of memory banks and supporting a page-mode function and an alternate-bank-access function, each of the memory banks having a plurality of logical memory sections, each of the logical memory sections forming a memory matrix having M memory columns and N memory rows, and the memory matrix being formed by memory units located in a common memory page, wherein M and N are natural numbers and each of the memory columns has a predetermined number of the memory units that have consecutive addresses; a second memory being capable of storing at least two rows of the data matrix of the error correction block, the second memory being used to temporarily store the data of the error correction block accessed from the optical storage medium; a memory controller used to control the first memory and the second memory, the memory controller using the alternate-bank-access function of the first memory to access the data matrix of the error correction block along the row direction of the data matrix from the second memory and write each row of me data matrix into the logical memory sections along a column direction of the logical memory sections, thus each column of the data matrix of the error correction block is accessed from the optical storage medium being stored into the logical memory sections along a row direction of the logical memory sections; an error correction decoder using the page-mode function of the first memory to access each column of the data matrix of the error correction block from the logical memory sections along the row direction of the logical memory sections; and a transmission interface using the page-mode function of the first memory to access each column of the data matrix of the error correction block, which has been corrected, from the logical memory sections along the row direction of the logical memory sections and then output the same.

15. The apparatus as claimed in claim 14, wherein the error correction block includes target data and parity data.

16. The apparatus as claimed in claim 14, wherein the error correction block is a long distance error correction code (LDC) block or a burst indicator subcode (BIS) block.

17. The apparatus as claimed in claim 14, wherein the first memory is a synchronous dynamic random access memory (SDRAM).

18. The apparatus as claimed in claim 14, wherein the second memory is static random access memory (SRAM).

19. The apparatus as claimed in claim 14, further comprising an error detection circuit to detect whether the data in the error correction block is correct or not by using the data accessed by the error correction decoder.

20. The apparatus as claimed in claim 14, wherein the transmission interface is a de-scrambler used to de-scramble the data of the error correction block.

21. The apparatus as claimed in claim 14, wherein the transmission interface is a video or audio interface used to transmit video or audio data.

22. The apparatus as claimed in claim 14, wherein the transmission interface is a host interface used to transmit the data of the error correction block to a host computer.

23. The apparatus as claimed in claim 14, further comprising an accessing device to access the error correction block from the optical storage medium.

24. The apparatus as claimed in claim 23, further comprising a de-interleaver to perform a de-interleaving operation on the error correction modulation block accessed from the optical storage medium to recover the error correction block.

25. The apparatus as claimed in claim 24, wherein the second memory is connected to the de-interleaver to store the de-interleaved data of the error correction block temporarily.

26. The apparatus as claimed in claim 14, wherein each of the memory units is capable of storing a word, wherein the size of the word is 2 bytes.

27. An apparatus for accessing and transferring optical data, the apparatus performing an error correction process on an error correction block, and the error correction block comprising a data matrix with a plurality of columns and a plurality of rows, wherein each column of the data matrix is a decoding set, the data matrix is recorded on an optical storage medium in a row direction to form an error correction modulation block, and a data arrangement order of the error correction modulation block has a relation to an data arrangement order in the rows of the error correction block, the apparatus comprising: a first memory used to store the data of the error correction block, the first memory having a plurality of memory banks and supporting a page-mode function and an alternate-bank-access function, each of the memory banks having a plurality of logical memory sections, each of the logical memory sections forming a memory matrix having M memory columns and N memory rows, and the memory matrix being formed by memory units located at a common memory page, wherein M and N are natural numbers and each of the memory columns has a predetermined number of the memory units that have consecutive addresses; a memory controller used to control the first memory, the memory controller using the page-mode function of the first memory to access the data matrix of the error correction block along the row direction of the data matrix and write each row of the data matrix into the logical memory sections along a column direction of the logical memory sections, thus each column of the data matrix of the error correction block accessed from the optical storage medium being stored into the logical memory sections along a row direction of the logical memory sections; an error correction decoder using the alternate-bank-access function of the first memory to access each column of the data matrix of the error correction block from the logical memory sections along the row direction of the logical memory sections; and a transmission interface using the alternate-bank-access function of the first memory to access each column of the data matrix of the error correction block, which has been corrected, from the logical memory sections along the row direction of the logical memory sections and then output the same.

28. The apparatus as claimed in claim 27, wherein the error correction block includes target data and parity data.

29. The apparatus as claimed in claim 27, wherein the error correction block is a long distance error correction code (LDC) block or a burst indicator subcode (BIS) block.

30. The apparatus as chimed in claim 27, wherein the first memory is a synchronous dynamic random access memory (SDRAM).

31. The apparatus as claimed in claim 27, further comprising an error detection circuit to detect whether the data in the error correction block is correct or not by using the data accessed by the error correction decoder.

32. The apparatus as claimed in claim 27, wherein the transmission interface is a de-scrambler used to de-scramble the data of the error correction block.

33. The apparatus as claimed in claim 27, wherein the transmission interface is a video or audio interface used to transmit video or audio data.

34. The apparatus as claimed in claim 27, wherein the transmission interface is a host interface used to transmit the data of the error correction block to a host computer.

35. The apparatus as claimed in claim 27, further comprising an accessing device to access the error correction block from the optical storage medium.

36. The apparatus as claimed in claim 35, further comprising a de-interleaver to perform a de-interleaving operation on the error correction modulation block accessed from the optical storage medium to recover the error correction block.

37. The apparatus as claimed in claim 36, further comprising a second memory capable of storing at least two rows of the data matrix of the error correction block, the second memory being connected to the de-interleaver to store the de-interleaved data of the error correction block temporarily.

38. The apparatus as claimed in claim 37, wherein the second memory is a static random access memory (SRAM).

39. The apparatus as claimed in claim 27, wherein each of the memory units is capable of storing a word, wherein the size of the word is 2 bytes.

40. An apparatus for accessing and transferring optical data, the apparatus performing an error correction process on an error correction block, and the error correction block comprising a data matrix with a plurality of columns and a plurality of rows, wherein each column of the data matrix is a decoding set, the data matrix is recorded on an optical storage medium in a row direction to form an error correction modulation block, and a data arrangement order of the error correction modulation block is related to a data arrangement order in the rows of the error correction block, the apparatus comprising: a first memory used to store the data of the error correction block, the first memory having a plurality of memory banks and supporting a page-mode function and an alternate-bank-access function, each of the memory banks having a plurality of logical memory sections, each of the logical memory sections forming a memory matrix having M memory columns and N memory rows, and the memory matrix being formed by memory units located at a common memory page, wherein M and N are natural numbers and each of the memory columns has a predetermined number of the memory units that have consecutive addresses; a second memory being capable of storing at least two rows of the data matrix of the error correction block, the second memory being used to temporarily store the data of the error correction block accessed from the optical storage medium; a memory controller used to control the first memory and the second memory, the memory controller using the page-mode function of the first memory to access the data matrix of the error correction block along the row direction of the data matrix from the second memory and write each row of the data matrix into the logical memory sections along a column direction of the logical memory sections, thus each column of the data matrix of the error correction block accessed from the optical storage medium being stored into the logical memory sections along a row direction of the logical memory sections; an error correction decoder using the alternate-bank-access function of the first memory to access each column of the data matrix of the error correction block from the logical memory sections along the row direction of the logical memory sections; and a transmission interface using the alternate-bank-access function of the first memory to access each column of the data matrix of the error correction block, which has been corrected, from the logical memory sections along the row direction of the logical memory sections and then output the same.

41. The apparatus as claimed in claim 40, wherein the error correction block includes target data and parity data.

42. The apparatus as claimed in claim 40, wherein the error correction block is a long distance error correction code (LDC) block or a burst indicator subcode (BIS) block.

43. The apparatus as claimed in claim 40, wherein the first memory is a synchronous dynamic random access memory (SDRAM).

44. The apparatus as claimed in claim 40, wherein the second memory is a static random access memory (SRAM).

45. The apparatus as claimed in claim 40, further comprising an error detection circuit to detect whether the data in the error correction block is correct or not by using the data accessed by the error correction decoder.

46. The apparatus as claimed in claim 40, wherein the transmission interface is a de-scrambler used to de-scramble the data of the error correction block.

47. The apparatus as claimed in claim 40, wherein the transmission interface is a video interface or an audio interface used to transmit video or audio data.

48. The apparatus as claimed in claim 40, wherein the transmission interface is a host interface used to transmit the data of the error correction block to a host computer.

49. The apparatus as claimed in claim 40, further comprising an accessing device to access the error correction block from the optical storage medium.

50. The apparatus as claimed in claim 49, further comprising a de-interleaver to perform a de-interleaving operation on the error correction modulation block accessed from the optical storage medium to recover the error correction block.

51. The apparatus as claimed in claim 50, wherein the second memory is connected to the de-interleaver to store the de-interleaved data of the error correction block temporarily.

52. The apparatus as claimed in claim 51, wherein each of the memory units is capable of storing a word, wherein the size of the word is 2 bytes.

53. An apparatus for accessing and transferring optical data, the apparatus performing an error correction process on an error correction block, and the error correction block comprising a first data matrix with a plurality of columns and a plurality of rows, wherein each column of the first data matrix is a decoding set, the error correction block is processed via a first interleaving operation and a second interleaving operation to form an error correction cluster, the error correction cluster is formed as a second data matrix with a plurality of columns and a plurality of rows, the error correction cluster is then recorded on an optical storage medium to form an error correction modulation block, and a data arrangement order of the error correction modulation block has a relation to a data arrangement order in the rows of the error correction cluster, the apparatus comprising: a first memory used to store the data of the error correction block, the first memory having a plurality memory banks and supporting a page-mode function and an alternate-bank-access function, each of the memory banks having a plurality of logical memory sections, each of the logical memory sections forming a memory matrix having M memory columns and N memory rows, and the memory matrix being formed by memory units located at a common memory page, wherein M and N are natural numbers and each of the memory columns has a predetermined number of the memory units that have consecutive addresses; a memory controller used to control the first memory, the memory controller using the alternate-bank-access function of the first memory to access the second data matrix of the error correction cluster along a row direction of the second data matrix after the error correction cluster is processed via a first de-interleaving operation and write each row of the second data matrix that has been processed via the first de-interleaving operation into the logical memory sections along a column direction of the logical memory sections, thus each column of the first data matrix of the error correction block being stored into the logical memory sections along a row direction of the logical memory sections; an error correction decoder using the page-mode function of the first memory to access each column of the first data matrix of the error correction block from the logical memory sections along the row direction of the logical memory sections; and a transmission interface using the page-mode function of the first memory to access each column of the first data matrix of the error correction block, which has been corrected, from the logical memory sections along the row direction of the logical memory sections and then output the same.

54. The apparatus as claimed in claim 53, wherein the error correction block includes target data and parity data.

55. The apparatus as claimed in claim 53, wherein the error correction block is a long distance error correction code (LDC) block or a burst indicator subcode (BIS) block.

56. The apparatus as claimed in claim 53, wherein the first memory is a synchronous dynamic random access memory (SDRAM).

57. The apparatus as claimed in claim 53, further comprising an error detection circuit to detect whether the data in the error correction block is correct or not by using the data accessed by the error correction decoder.

58. The apparatus as claimed in claim 53, wherein the transmission interface is a de-scrambler used to de-scramble the data of the error correction block.

59. The apparatus as claimed in claim 53, wherein the transmission interface is a video interface or an audio interface used to transmit video or audio data.

60. The apparatus as claimed in claim 53, wherein the transmission interface is a host interface used to transmit the data of the error correction block to a host computer.

61. The apparatus as claimed in claim 53, further comprising an accessing device to access the error correction block from the optical storage medium.

62. The apparatus as claimed in claim 61, further comprising a de-interleaver to perform the first de-interleaving operation on the error correction cluster accessed from the optical storage medium.

63. The apparatus as claimed in claim 53, wherein each of the memory units is capable of storing n bytes of data, where n is a positive integer.

64. The apparatus as claimed in claim 63, further comprising a second memory being capable of storing at least (n−1)*2 rows of the second data matrix of the error correction cluster, the second memory being used to temporarily store a predetermined number of the rows of the second data matrix of the error correction cluster that has been processed via the first de-interleaving operation.

65. The apparatus as claimed in claim 64, wherein the second memory is a static random access memory (SRAM).

66. The apparatus as claimed in claim 64, wherein the memory controller is used to control the second memory to take out n bytes of data of one of the decoding sets and write the same into one of the memory units of the first memory.

67. The apparatus as claimed in claim 63, wherein the memory controller is used to control the second memory to take out n bytes of data of one of the rows of the second data matrix of the error correction cluster that has been processed via the first de-interleaving operation and write the same into one of the memory units of the first memory.

68. The apparatus as claimed in claim 67, wherein the error correction decoder is capable of simultaneously decoding n decoding sets.

69. The apparatus as claimed in claim 67, further comprising a second memory for temporarily storing a predetermined number of the columns of the first data matrix of the error correction block that is accessed from the logical memory sections and has been corrected.

70. The apparatus as claimed in claim 53, wherein each of the memory units is capable of storing a word, wherein the size of the word is 2 bytes.

71. An apparatus for accessing and transferring optical data, the apparatus performing an error correction process on an error correction block, and the error correction block comprising a first data matrix with a plurality of columns and a plurality of rows, wherein each column of the first data matrix is a decoding set, the error correction block is processed via a first interleaving operation and a second interleaving operation to form an error correction cluster, the error correction cluster is formed as a second data matrix with a plurality of columns and a plurality of rows, the error correction cluster is then recorded on an optical storage medium to form an error correction modulation block, and an data arrangement order of the error correction modulation block is relative to a data arrangement order in the rows of the error correction cluster, the apparatus comprising: a first memory used to store the data of the error correction block, the first memory having a plurality of memory banks and supporting a page-mode function and an alternate-bank-access function, each of the memory banks having a plurality of logical memory sections, each of the logical memory sections forming a memory matrix having M memory columns and N memory rows, and the memory matrix being formed by memory units located at a common memory page, wherein M and N are natural numbers and each of the memory columns has a predetermined number of the memory units that have consecutive addresses; a memory controller used to control the first memory, the memory controller using the page-mode function of the first memory to access the second data matrix of the error correction cluster along a row direction of the second data matrix after the error correction cluster is processed via a first de-interleaving operation and write each row of the second data matrix that has been processed via the first de-interleaving operation into the logical memory sections along a column direction of the logical memory sections, thus each column of the first data matrix of the error correction block being stored into the logical memory sections along a row direction of the logical memory sections; an error correction decoder using the alternate-bank-access function of the first memory to access each column of the first data matrix of the error correction block from the logical memory sections along the row direction of the logical memory sections; and a transmission interface using the alternate-bank-access function of the first memory to access each column of the first data matrix of the error correction block, which has been corrected, from the logical memory sections along the row direction of the logical memory sections and then output the same.

72. The apparatus as claimed in claim 71, wherein the error correction block includes target data and parity data.

73. The apparatus as claimed in claim 71, wherein the error correction block is a long distance error correction code (LDC) block or a burst indicator subcode (BIS) block.

74. The apparatus as chimed in claim 71, wherein the first memory is a synchronous dynamic random access memory (SDRAM).

75. The apparatus as claimed in claim 71, further comprising an error detection circuit to detect whether the data in the error correction block is correct or not by using the data accessed by the error correction decoder.

76. The apparatus as claimed in claim 71, wherein the transmission interface is a de-scrambler used to de-scramble the data of the error correction block.

77. The apparatus as claimed in claim 71, wherein the transmission interface is a video interface or an audio interface used to transmit video or audio data.

78. The apparatus as claimed in claim 71, wherein the transmission interface is a host interface used to transmit the data of the error correction block to a host computer.

79. The apparatus as claimed in claim 71, further comprising an accessing device to access the error correction block from the optical storage medium.

80. The apparatus as claimed in claim 79, further comprising a de-interleaver to perform the first de-interleaving operation on the error correction cluster accessed from the optical storage medium.

81. The apparatus as claimed in claim 71, wherein each of the memory units is capable of storing n bytes of data, where n is a positive integer.

82. The apparatus as claimed in claim 81, further comprising a second memory being capable of storing at least $(n-1)*2$ rows of the second data matrix of the error correction cluster, the second memory being used to temporarily store a predetermined number of the rows of the second data matrix of the error correction cluster that has been processed via the first de-interleaving operation.

83. The apparatus as claimed in claim 82, wherein the second memory is a static random access memory (SRAM).

84. The apparatus as claimed in claim 82, wherein the memory controller is used to control the second memory to take out n bytes of data of one of the decoding sets and write the same into one of the memory units of the first memory.

85. The apparatus as claimed in claim 81, wherein the memory controller is used to control the second memory to take out n bytes of data of one of the rows of the second data matrix of the error correction cluster that has been processed via the first de-interleaving operation and write the same into one of the memory units of the first memory.

86. The apparatus as claimed in claim 85, wherein the error correction decoder is capable of simultaneously decoding n decoding sets.

87. The apparatus as claimed in claim 85, further comprising a second memory for temporarily storing a predetermined number of the columns of the first data matrix of the error correction block that is accessed from the logical memory sections and has been corrected.

88. The apparatus as claimed in claim 71, wherein each of the memory units is capable of storing a word.

* * * * *